US012637136B2

(12) United States Patent
Endo et al.

(10) Patent No.: US 12,637,136 B2
(45) Date of Patent: May 26, 2026

(54) CONTROL DEVICE AND STEERING DEVICE

(71) Applicant: NIDEC CORPORATION, Kyoto (JP)

(72) Inventors: Shuji Endo, Kyoto (JP); Sohei Miyake, Kyoto (JP); Daisuke Notsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 41 days.

(21) Appl. No.: 18/754,621

(22) Filed: Jun. 26, 2024

(65) Prior Publication Data

US 2025/0002076 A1     Jan. 2, 2025

Related U.S. Application Data

(60) Provisional application No. 63/523,925, filed on Jun. 29, 2023.

(30) Foreign Application Priority Data

Dec. 28, 2023     (JP) ................................. 2023-223214

(51) Int. Cl.
B62D 5/04          (2006.01)
B62D 6/00          (2006.01)
(52) U.S. Cl.
CPC ........... B62D 5/0469 (2013.01); B62D 6/008 (2013.01)
(58) Field of Classification Search
CPC ........ B62D 5/046; B62D 5/002; B62D 5/001; B62D 6/008
See application file for complete search history.

(56) References Cited

U.S. PATENT DOCUMENTS

| | | | |
|---|---|---|---|
| 2010/0004824 A1* | 1/2010 | Ikeda ................... | B62D 5/0463 701/42 |
| 2010/0235047 A1* | 9/2010 | Kurishige ............ | B62D 5/0472 701/41 |
| 2011/0054740 A1* | 3/2011 | Kurishige ............ | B62D 5/0463 701/42 |
| 2016/0200354 A1* | 7/2016 | Kimura ................ | B62D 5/0472 701/42 |
| 2018/0111642 A1* | 4/2018 | Endo ...................... | B62D 6/008 |
| 2019/0100234 A1* | 4/2019 | Kezobo ................. | B60W 10/20 |
| 2020/0377148 A1* | 12/2020 | Nakade ............... | B62D 15/025 |
| 2023/0100977 A1* | 3/2023 | Endo ................... | B62D 5/0463 701/41 |

(Continued)

*Primary Examiner* — Long T Tran
(74) *Attorney, Agent, or Firm* — Keating & Bennett, LLP

(57)     ABSTRACT

A control device mounted on a steer-by-wire steering device mounted on a vehicle includes a steering assembly including a steering wheel to be steered by a steering operator, a turning assembly including a first turning wheel and a second turning wheel, a turning side motor to drive the turning assembly, and a turning side controller configured or programmed to control a control target including the turning side motor. The turning side controller is configured or programmed to include a model following controller configured or programmed to generate a correction torque to correct an input torque input to the control target based on output of the control target and a nominal model based on a configuration of the control target. The model following controller is configured or programmed such that a transfer function of the control target is restricted to a transfer function of the nominal model.

19 Claims, 16 Drawing Sheets

(56)　　　　　References Cited

U.S. PATENT DOCUMENTS

| | | | |
|---|---|---|---|
| 2023/0202554 A1* | 6/2023 | Endo | B62D 5/0421 |
| | | | 701/41 |
| 2023/0202559 A1* | 6/2023 | Endo | B62D 5/0463 |
| | | | 701/41 |
| 2023/0202560 A1* | 6/2023 | Endo | B62D 6/008 |
| | | | 701/41 |

* cited by examiner

FEEL SENSE OF DISCOMFORT
IN TRAVELING DIRECTION $T_a = T_b$

REGION WHERE
FEELING OF
STEERING PERSON
IS EXCELLENT

FEEL MOVEMENT IS SLOW

FEEL SENSE OF STEADINESS IS
INSUFFICIENT

FEEL MOVEMENT IS FAST

YAW RATE TIME CONSTANT $T_b$ [sec]

0.15

0.10

0.05

0.0    0.05    0.10    0.15

LATERAL ACCELERATION TIME CONSTANT $T_a$ [sec]

56a $SAT_{h1}$
$SAT_{h2}$ $T_{m1}$ $T_{m2}$ 56c    56d

Fig. 11

CONTROL DEVICE AND STEERING DEVICE

CROSS-REFERENCE TO RELATED APPLICATIONS

The present application is a Non-Provisional of U.S. Patent Application No. 63/523,925, filed on Jun. 29, 2023, and claims priority under 35 U.S.C. § 119 to Japanese Patent Application No. 2023-223214, filed on Dec. 28, 2023, the entire contents of both applications are hereby incorporated herein by reference.

1. FIELD OF THE INVENTION

The present disclosure relates to control devices and steering devices.

2. BACKGROUND

Conventionally, a separate type power steering device that is not mechanically connected, what is called a steer-by-wire steering device is known.

In the steering device as described above, it has been desired to further improve steering performance.

SUMMARY

One example embodiment of a control device of the present disclosure is a control device mounted on a steer-by-wire steering device mounted on a vehicle, the control device including a steering assembly including a steering wheel to be steered by a steering operator, a turning assembly including a first turning wheel and a second turning wheel, a turning side motor to drive the turning assembly, and a turning side controller configured or programmed to control a control target including the turning side motor. The turning side controller is configured or programmed to include a model following controller configured or programmed to generates a correction torque to correct an input torque input to the control target based on output of the control target and a nominal model based on a configuration of the control target. The model following controller is configured or programmed such that, in a frequency band in which a gain in a gain characteristic of a complementary sensitivity function with respect to a modeling error between the control target and the nominal model is approximately one, a transfer function of the control target is restricted to a transfer function of the nominal model.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 4A is a diagram schematically illustrating a portion of the first turning side motor and a portion of a first turning side controller in the first example embodiment.

FIG. 4B is a diagram schematically illustrating a portion of a second turning side motor and a portion of a second turning side controller in the first example embodiment.

FIG. 11 is a block diagram illustrating a configuration of a steering reaction force controller according to the first example embodiment.

DETAILED DESCRIPTION

Figure 1:
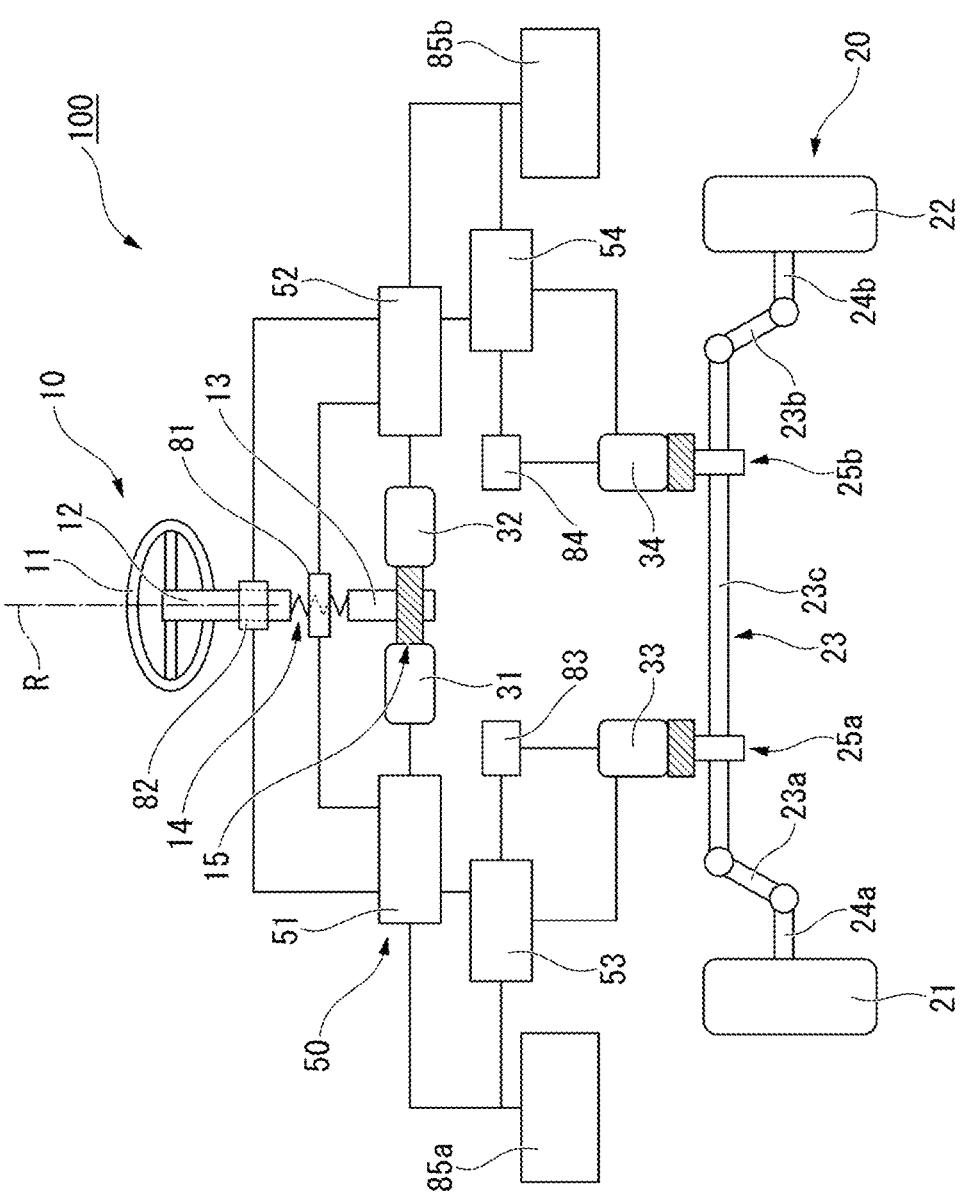
FIG. 1 is a diagram schematically illustrating a steering device according to a first example embodiment of the present disclosure.

A steering device 100 of the present example embodiment illustrated in FIG. 1 is mounted on a vehicle. The steering device 100 is a steer-by-wire steering device. As illustrated in FIG. 1, the steering device 100 includes a steering assembly 10 including a steering wheel 11 steered by a steering operator, a turning assembly 20 including a first turning wheel 21 and a second turning wheel 22, a first steering side motor 31, a second steering side motor 32, a first turning side motor 33, a second turning side motor 34, a control device 50, a steering torque sensor 81, a steering angle sensor 82, a first rotation sensor 83, a second rotation sensor 84, a first battery 85a, and a second battery 85b. The control device 50 includes a first steering side controller 51, a second steering side controller 52, a first turning side controller 53, and a second turning side controller 54. The first battery 85a supplies power to the first steering side controller 51 and the first turning side controller 53. The second battery 85*b* supplies power to the second steering side controller 52 and the second turning side controller 54.

When a driver who drives a vehicle, that is, a steering operator, steers the steering assembly 10 via the steering wheel 11, the first turning side motor 33 and the second turning side motor 34 are driven by the control device 50, and the turning assembly 20 is driven by the first turning side motor 33 and the second turning side motor 34. When the turning assembly 20 is driven, an angle of the first turning wheel 21 and an angle of the second turning wheel 22 are changed, and a traveling direction of a vehicle is changed. The first turning wheel 21 and the second turning wheel 22 are a pair of tires on the front side in a vehicle. An angle of the first turning wheel 21 and an angle of the second turning wheel 22 are turning angles.

The steering assembly 10 includes the steering wheel 11, an input shaft 12, an output shaft 13, a torsion bar 14, and a first transmission mechanism 15. The input shaft 12 is a shaft extending from the steering wheel 11 steered by a steering operator. The output shaft 13 is connected to the input shaft 12 via the torsion bar 14. The first transmission mechanism 15 is connected to the output shaft 13. The input shaft 12 and the output shaft 13 are coaxially arranged. The input shaft 12 and the output shaft 13 are rotatable around the same central axis. In description hereinafter, a virtual axis passing through a common central axis of the input shaft 12 and the output shaft 13 is referred to as a rotation axis R. The input shaft 12 and the output shaft 13 can rotate relative to each other in a range in which the torsion bar 14 can be twisted. The torsion bar 14 couples the input shaft 12 and the output shaft 13. The torsion bar 14 can be twisted around the rotation axis R. A rotation angle of the input shaft 12 around the rotation axis R is a steering angle θh of the steering wheel 11. The steering angle θh is detected by the steering angle sensor 82. A rotation angle around the rotation axis R of the output shaft 13 is an output angle θs.

The first transmission mechanism 15 connects the output shaft 13 to the first steering side motor 31 and the second steering side motor 32. The first transmission mechanism 15 transmits rotational torque of the first steering side motor 31 and rotational torque of the second steering side motor 32 to the output shaft 13 as torque around the rotation axis R. The first transmission mechanism 15 is, for example, a speed reduction mechanism including a worm gear and the like. By rotating the output shaft 13 via the first transmission mechanism 15 by the first steering side motor 31 and the second steering side motor 32 to control the output angle θs, it is possible to control an amount of twist of the torsion bar 14 around the rotation axis R. By the above, force around the rotation axis R transmitted from the torsion bar 14 to the steering wheel 11 via the input shaft 12 can be controlled, and a steering reaction force transmitted to a steering operator via the steering wheel 11 can be controlled. The steering reaction force is equal to a steering torque Th.

The steering torque Th is detected by the steering torque sensor 81. The steering torque sensor 81 detects the steering torque Th by detecting an amount of twist around the rotation axis R of the torsion bar 14. The steering torque Th is a torsion bar torque generated in the torsion bar 14, and is a torsional moment around the rotation axis R. In the present example embodiment, a rotation angle of the output shaft 13, that is, the output angle θs can be detected based on the steering torque sensor 81 and the steering angle sensor 82.

Figure 2:
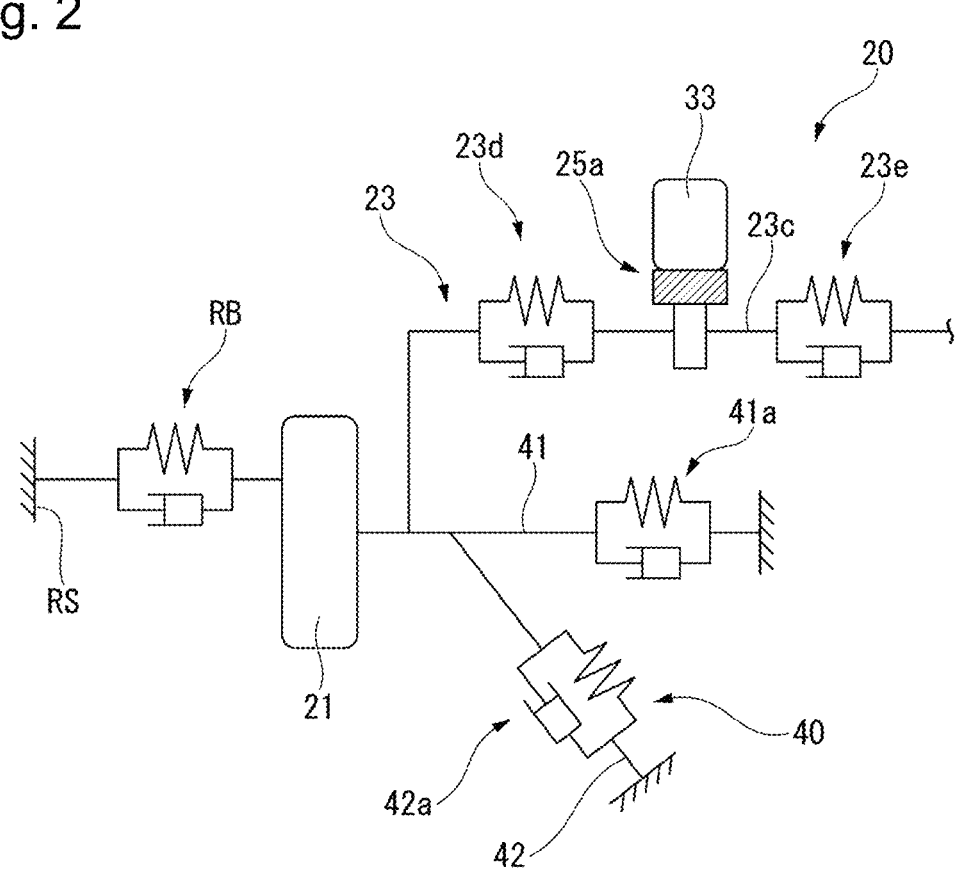
FIG. 2 is a diagram schematically illustrating a portion of a turning assembly in the first example embodiment of the present disclosure.

The turning assembly 20 includes the first turning wheel 21, a second turning wheel 22, a steering linkage 23, knuckle arms 24*a* and 24*b*, and second transmission mechanisms 25*a* and 25*b*. The steering linkage 23 includes a rack shaft 23*c* and tie rods 23*a* and 23*b*. The rack shaft 23*c* extends in a left-right direction of a vehicle, that is, in a vehicle width direction. As illustrated in FIG. 2, bushings 23*d* and 23*e* are provided in a portion on a side where the first turning wheel 21 is arranged of the rack shaft 23*c*. Although not illustrated, a bushing is also provided in a portion on a side where the second turning wheel 22 is arranged of the rack shaft 23*c*, similarly to the portion on the side where the first turning wheel 21 is arranged of the rack shaft 23*c*. Note that, in FIG. 2, elasticity and viscosity of the first turning wheel 21 are represented as a bushing element RB between a road surface RS and the first turning wheel 21.

As illustrated in FIG. 1, the first turning wheel 21 is connected to one end portion of the rack shaft 23*c* via the tie rod 23*a* and the knuckle arm 24*a*. The second turning wheel 22 is connected to another end portion of the rack shaft 23*c* via the tie rod 23*b* and the knuckle arm 24*b*. The second transmission mechanism 25*a* connects the rack shaft 23*c* and the first turning side motor 33. The second transmission mechanism 25*b* connects the rack shaft 23*c* and the second turning side motor 34. The second transmission mechanism 25*a* is connected to a portion on a side close to the first turning wheel 21 in the vehicle width direction of the rack shaft 23*c*. The second transmission mechanism 25*b* is connected to a portion on a side close to the second turning wheel 22 in the vehicle width direction of the rack shaft 23*c*. The second transmission mechanism 25*a* is a speed reduction mechanism having a pinion gear that meshes with the rack shaft 23*c*. The second transmission mechanism 25*b* is a speed reduction mechanism having a pinion gear that meshes with the rack shaft 23*c*.

As illustrated in FIG. 2, the first turning wheel 21 is provided with a suspension 40. The suspension 40 includes a transverse link 41 and a tension rod 42. The transverse link 41 is provided with a bushing 41*a*. The tension rod 42 is provided with a bushing 42*a*. Although not illustrated, the second turning wheel 22 is also provided with the suspension 40 similarly to the first turning wheel 21.

The first steering side motor 31 and the second steering side motor 32 can drive the steering assembly 10. The first turning side motor 33 is controlled by the first turning side controller 53. The second turning side motor 34 is controlled by the second turning side controller 54. The first turning side motor 33 and the second turning side motor 34 drive the turning assembly 20.

Figure 3:
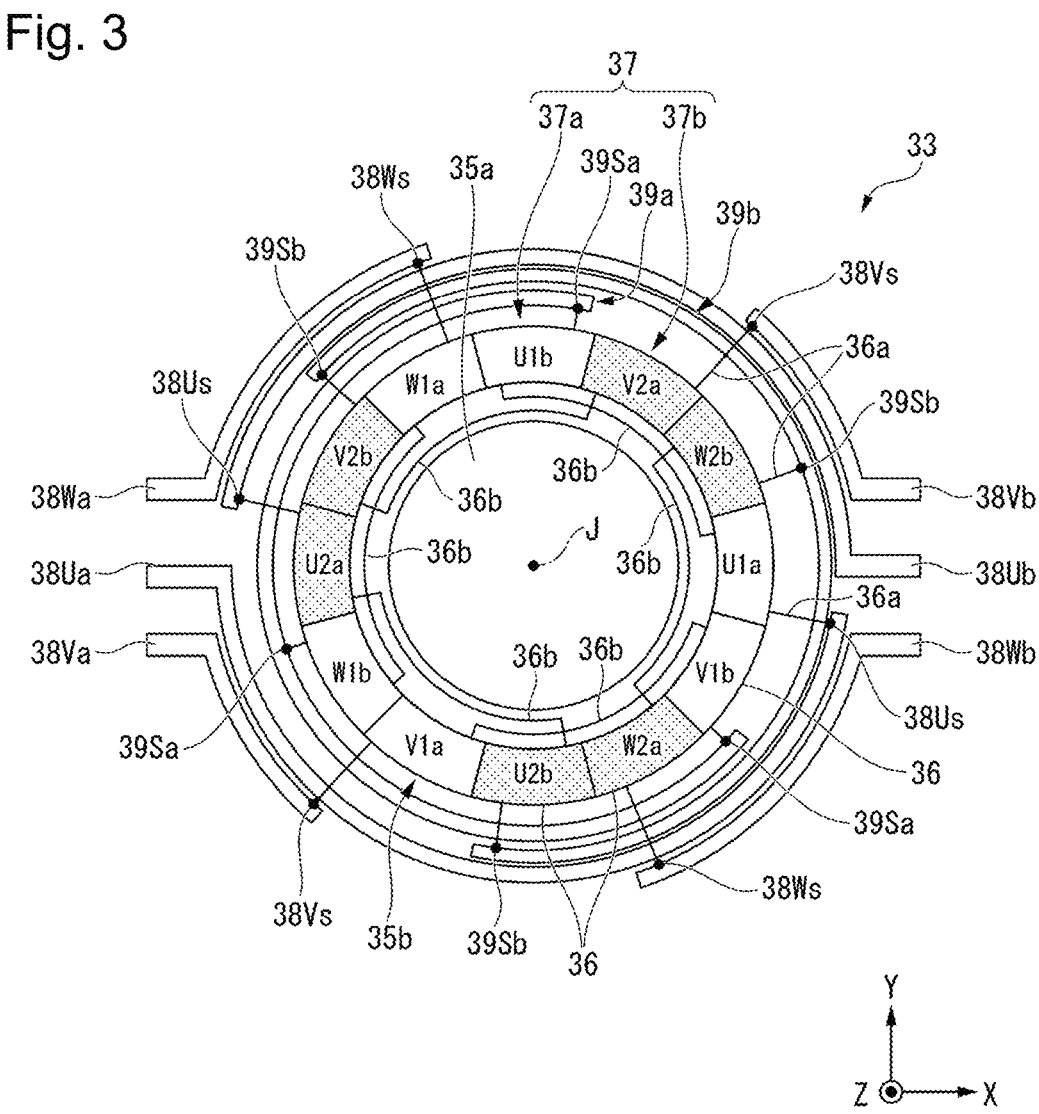
FIG. 3 is a diagram schematically illustrating a portion of a first turning side motor according to the first example embodiment.

As illustrated in FIG. 3, the first turning side motor 33 includes a rotor 35*a* and a stator 35*b*. The rotor 35*a* is rotatable around a central axis J. In description hereinafter, a direction in which the central axis J extends is simply referred to as the "axial direction", a radial direction around the central axis J is simply referred to as the "radial direction", and a circumferential direction around the central axis J is simply referred to as the "circumferential direction". The stator 35*b* is located radially outside the rotor 35*a*. The stator 35*b* surrounds the rotor 35*a*. The stator 35*b* includes a plurality of coils 36 arranged over the entire circumference in the circumferential direction. In the present example embodiment, twelve of the coils 36 are provided. Twelve of the coils 36 include four U-phase coils U1*a*, U1*b*, U2*a*, and U2*b*, four V-phase coils V1*a*, V1*b*, V2*a*, and V2*b*, and four W-phase coils W1*a*, W1*b*, W2*a*, and W2*b*.

Figure 4A:
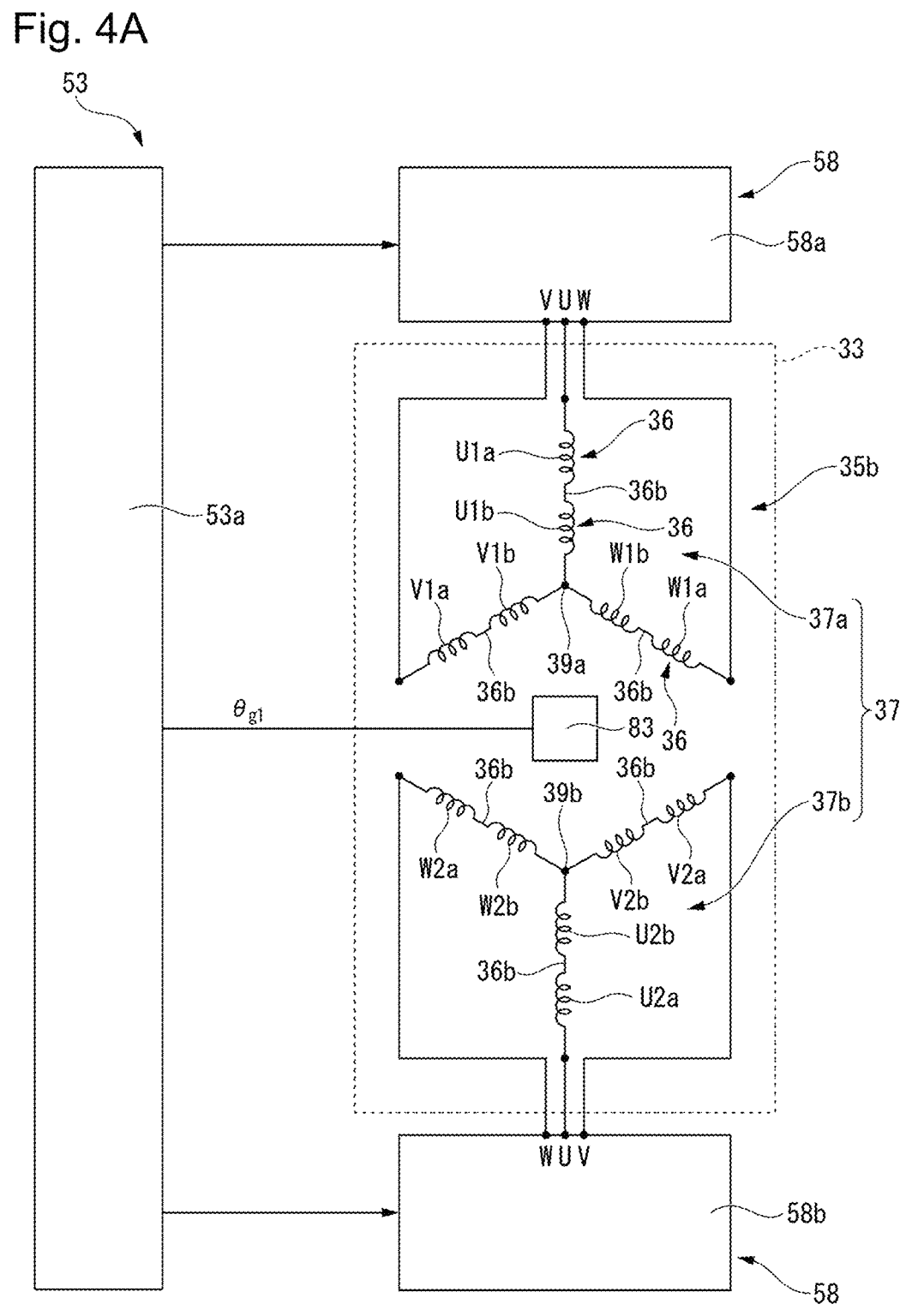

As illustrated in FIG. 4A, the stator 35*b* in the first turning side motor 33 includes coil groups 37 of a plurality of systems. In the present example embodiment, as the coil groups 37 in the first turning side motor 33, two coil groups, a first coil group 37*a* of a first system and a second coil group 37*b* of a second system are provided. The first coil group 37*a* of the first system includes two of the U-phase coils U1*a* and U1*b*, two of the V-phase coils V1*a* and V1*b*, and two of the W-phase coils W1*a* and W1*b*. The second coil group 37*b* of the second system includes two of the U-phase coils U2*a* and U2*b*, two of the V-phase coils V2*a* and V2*b*, and two of the W-phase coils W2*a* and W2*b*. That is, two of the coils 36 are provided in one phase of each system. Two of the coils 36 of each phase of each system are connected to each other by a jumper wire 36*b*. In the first coil group 37*a* of the first system, the U-phase coils U1*a* and U1*b*, the V-phase coils V1*a* and V1*b*, and the W-phase coils W1*a* and W1*b* are connected to each other by Y connection. In the second coil group 37*b* of the second system, the U-phase coils U2*a* and U2*b*, the V-phase coils V2*a* and V2*b*, and the W-phase coils W2*a* and W2*b* are connected to each other by Y connection.

As illustrated in FIG. 3, in the first turning side motor 33, the first coil groups 37*a* and 37*b* of different systems are arranged rotationally symmetrically around the central axis J. By the above, redundancy of the first turning side motor 33 can be ensured. That is, even in a case where a failure occurs in any one of the coil groups 37 of a plurality of systems, the first turning side motor 33 can be suitably driven using the coil groups 37 of another system.

Note that, in the present description, "systems of the coil groups are different" includes that current is independently supplied to the coil group for each system. That is, three-phase alternating current is independently supplied to the first coil group 37*a* and the second coil group 37*b*.

In the present example embodiment, the first coil group 37*a* and the second coil group 37*b* are arranged two-fold symmetrically with each other around the central axis J. That is, in a case where the first coil group 37*a* is rotated by 180° around the central axis J, a position of the coil 36 of each phase in the first coil group 37*a* coincides with a position of the coil 36 of each phase in the second coil group 37*b* in the circumferential direction. As described above, as the first coil group 37*a* and the second coil group 37*b* are arranged two-fold symmetrically with each other around the central axis J, the coils 36 of the first coil group 37*a* and the coils 36 of the second coil group 37*b* in phase with each other are easily arranged apart from each other, and mutual inductance generated between the first coil group 37*a* and the second coil group 37*b* is easily reduced to be small. Therefore, it is easy to enhance magnetic independence of two of the coil groups 37 of different systems. For this reason, it is easy to improve controllability of torque ripple and the like by model following control described later.

Note that a plurality of the coil groups 37 may have rotational symmetry of any order, as long as the coil groups are rotationally symmetric around the central axis J. For example, in a case where three of the coil groups 37 are provided, the three coil groups 37 may be arranged three-fold symmetrically around the central axis J. In this case, when one of the coil groups 37 is rotated by 120° around the central axis J, a position of the coil 36 of each phase in the one coil group 37 coincides with a position of the coil 36 of each phase in another one of the coil groups 37 in the circumferential direction. Also in this case, as in the case of two of the coil groups 37 described above, mutual inductance generated between three of the coil groups 37 can be easily reduced to be small. Therefore, it is easy to enhance magnetic independence of three of the coil groups 37 of different systems. For this reason, it is easy to improve controllability of torque ripple and the like by model following control described later.

In the present example embodiment, the coil 36 in the first coil group 37*a* of the first system and the coil 36 in the second coil group 37*b* of the second system are arranged with the central axis J between them in the radial direction. The coil 36 of the first coil group 37*a* and the coil 36 of the second coil group 37*b* arranged with the central axis J between them in the radial direction are coils in phase with each other. That is, for example, the U-phase coil U1*a* of the first coil group 37*a* and the U-phase coil U2*a* of the second coil group 37*b* are arranged with the central axis J between them in the radial direction, the V-phase coil V1*a* of the first coil group 37*a* and the V-phase coil V2*a* of the second coil group 37*b* are arranged with the central axis J between them in the radial direction, and the W-phase coil W1*a* of the first coil group 37*a* and the W-phase coil W2*a* of the second coil group 37*b* are arranged with the central axis J between them in the radial direction.

One lead wire 36*a* extends in the axial direction from each of the coils 36. The lead wire 36*a* extending from the U-phase coil U1*a* in the first coil group 37*a* is connected to a U-phase bus bar 38Ua via a connection terminal 38Us. The lead wire 36*a* extending from the V-phase coil V1*a* in the first coil group 37*a* is connected to a V-phase bus bar 38Va via a connection terminal 38Vs. The lead wire 36*a* extending from the W-phase coil W1*a* in the first coil group 37*a* is connected to a W-phase bus bar 38Wa via a connection terminal 38Ws. The lead wire 36*a* extending from the U-phase coil U1*b*, the lead wire 36*a* extending from the V-phase coil V1*b*, and the lead wire 36*a* extending from the W-phase coil W1*b* in the first coil group 37*a* are connected to a neutral point bus bar 39*a* via a connection terminal 39Sa.

The lead wire 36*a* extending from the U-phase coil U2*a* in the second coil group 37*b* is connected to a U-phase bus bar 38Ub via the connection terminal 38Us. The lead wire 36*a* extending from the V-phase coil V2*a* in the second coil group 37*b* is connected to a V-phase bus bar 38Vb via the connection terminal 38Vs. The lead wire 36*a* extending from the W-phase coil W2*a* in the second coil group 37*b* is connected to a W-phase bus bar 38Wb via the connection terminal 38Ws. The lead wire 36*a* extending from the U-phase coil U2*b*, the lead wire 36*a* extending from the V-phase coil V2*b*, and the lead wire 36*a* extending from the W-phase coil W2*b* in the second coil group 37*b* are connected to a neutral point bus bar 39*b* via a connection terminal 39Sb.

Figure 4B:
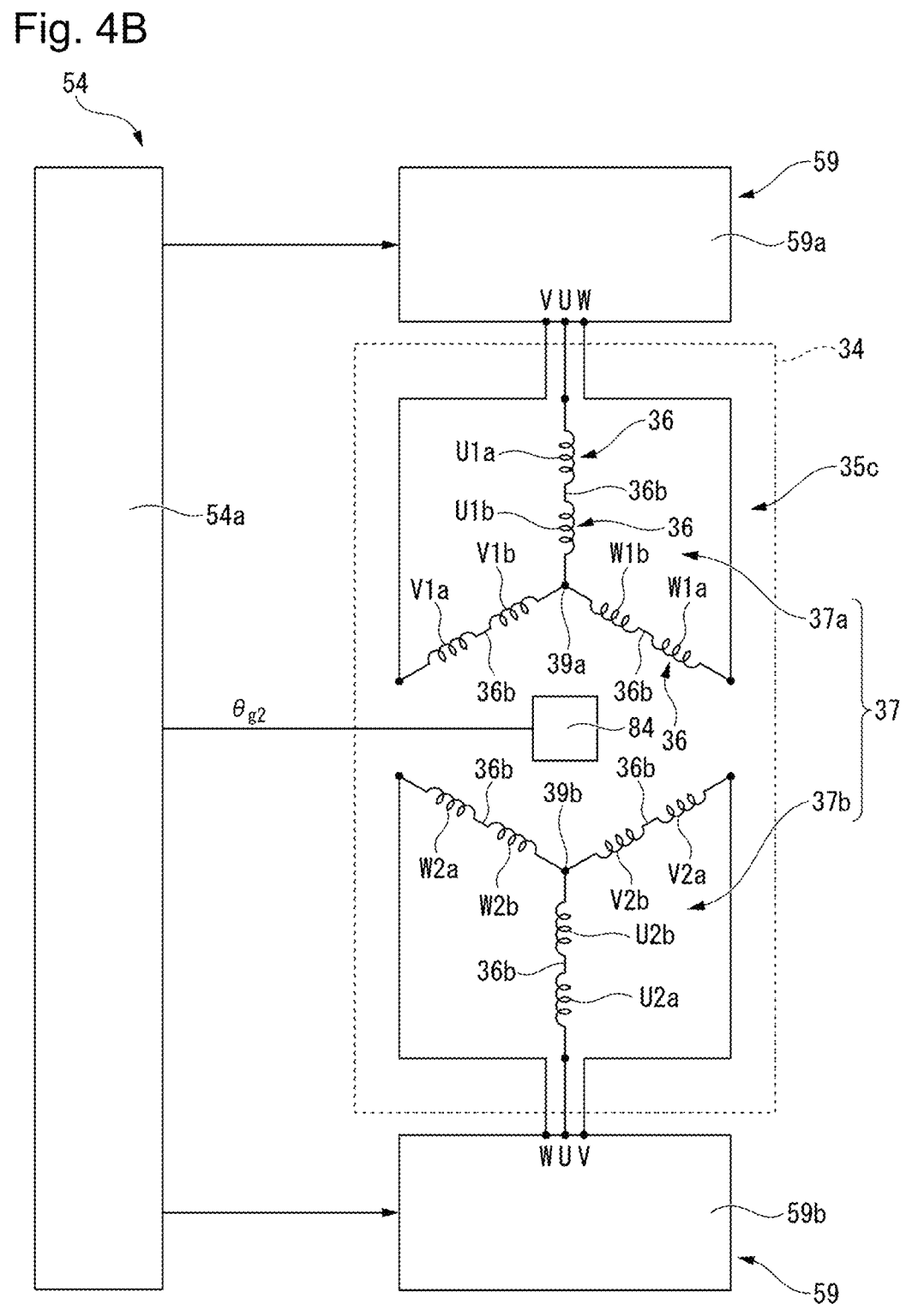

A structure of the second turning side motor 34 is similar to a structure of the first turning side motor 33. As illustrated in FIG. 4B, the second turning side motor 34 includes a stator 35*c*. The stator 35*c* of the second turning side motor 34 includes the coil groups 37 of a plurality of systems, similarly to the stator 35*b* of the first turning side motor 33. In the present example embodiment, as the coil groups 37 in the second turning side motor 34, two coil groups, the first coil group 37*a* of a first system and the second coil group 37*b* of a second system are provided. Although not illustrated, in the second turning side motor 34, the coil groups 37 of different systems are arranged rotationally symmetrically around a central axis of the second turning side motor 34, similarly to the coil groups 37 in the first turning side motor 33. For example, in the second turning side motor 34, the first coil group 37*a* and the second coil group 37*b* are arranged two-fold symmetrically with each other around the central axis J. By the above, similarly to the first turning side motor 33, redundancy of the second turning side motor 34 can be ensured.

A first output angle θg1, which is a rotation angle of the first turning side motor 33, is detected by the first rotation sensor 83. A second output angle θg2, which is a rotation angle of the second turning side motor 34, is detected by the second rotation sensor 84. A rotation angle of each turning side motor is a rotation angle around the central axis R of the rotor 35a in each turning side motor. The first output angle θg1 is equal to a rotation angle of a pinion gear attached to an output shaft of the first turning side motor 33, that is, a pinion absolute angle. The second output angle θg2 is equal to a rotation angle of a pinion gear attached to an output shaft of the second turning side motor 34, that is, a pinion absolute angle. As illustrated in FIG. 4A, the first output angle θg1 detected by the first rotation sensor 83 is input to a first processor 53a described later in the first turning side controller 53. As illustrated in FIG. 4B, the second output angle θg2 detected by the second rotation sensor 84 is input to a second processor 54a described later in the second turning side controller 54.

A structure of the first steering side motor 31 and a structure of the second steering side motor 32 may be similar to a structure of the first turning side motor 33 or may be different from a structure of the first turning side motor 33. The first steering side motor 31 and the second steering side motor 32 may have coil groups of a plurality of systems, or may have only a coil group of one system.

The control device 50 controls each unit of the steering device 100. In the present example embodiment, the control device 50 controls the first turning side motor 33 and the second turning side motor 34 to control the turning assembly 20, and controls the first steering side motor 31 and the second steering side motor 32 to control steering reaction force transmitted to a steering operator via the steering wheel 11. The first steering side controller 51 controls the first steering side motor 31. The second steering side controller 52 controls the second steering side motor 32. The first turning side controller 53 controls the first turning side motor 33. The second turning side controller 54 controls the second turning side motor 34. The first steering side controller 51 and the first turning side controller 53 can communicate with each other. The second steering side controller 52 and the second turning side controller 54 can communicate with each other. For this reason, in the steer-by-wire steering device 100 in which the steering assembly 10 and the turning assembly 20 are not mechanically connected, the steering assembly 10 and the turning assembly 20 can be suitably controlled.

Figure 5:
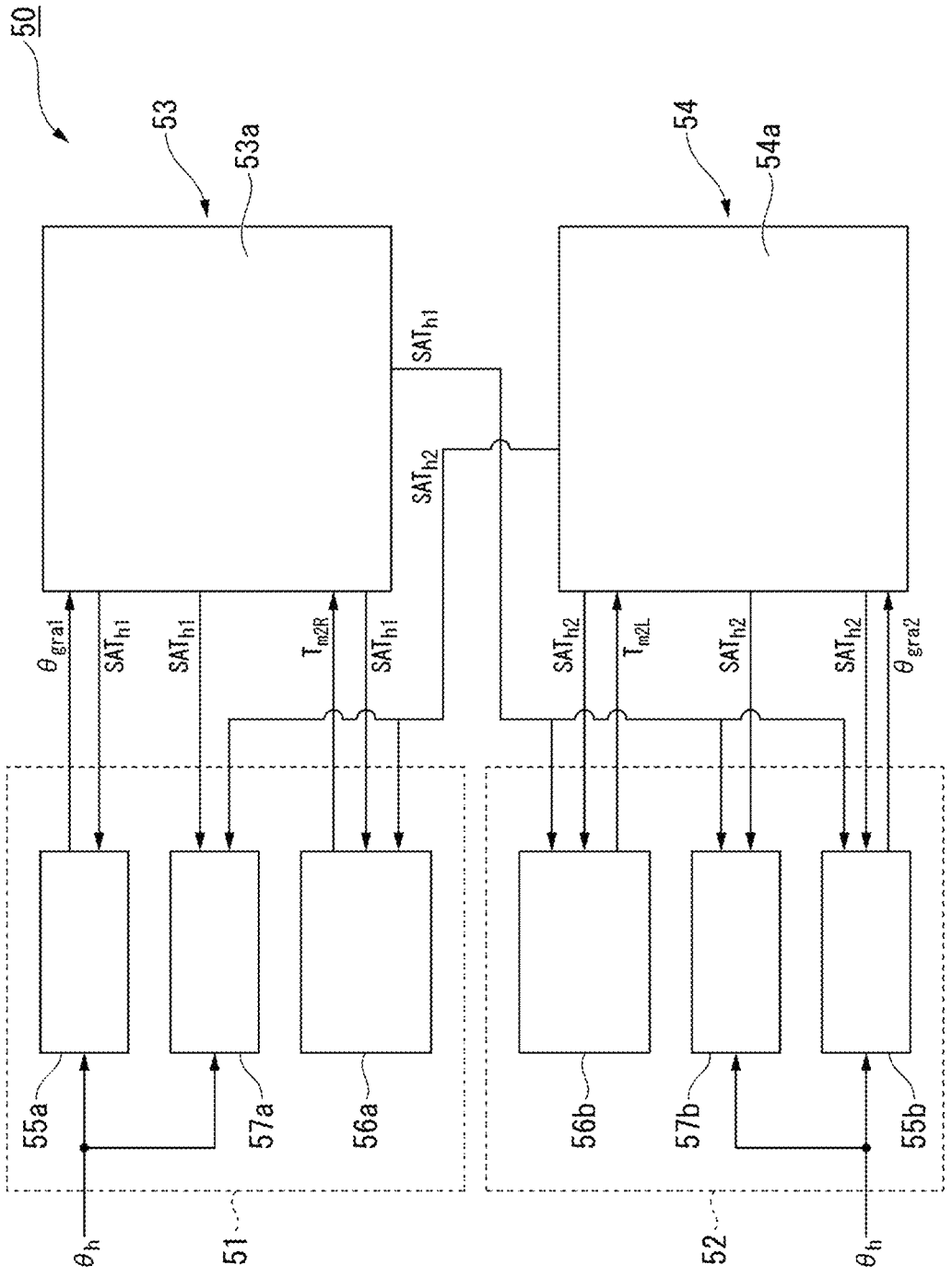
FIG. 5 is a block diagram illustrating a configuration of a control device according to the first example embodiment.

As illustrated in FIG. 5, the first steering side controller 51 includes a command value generator 55a, a cooperative controller 56a, and a steering reaction force controller 57a. The second steering side controller 52 includes a command value generator 55b, a cooperative controller 56b, and a steering reaction force controller 57b. That is, the control device 50 includes the command value generators 55a and 55b, the cooperative controllers 56a and 56b, and the steering reaction force controllers 57a and 57b.

The command value generator 55a generates a turning side motor angle command value θgr1 sent to the first turning side controller 53. The command value generator 55b generates a turning side motor angle command value θgr2 sent to the second turning side controller 54. The turning side motor angle command value θgr1 is a target value of the first output angle θg1 of the first turning side motor 33. The turning side motor angle command value θgr2 is a target value of the second output angle θg2 of the second turning side motor 34. The turning side motor angle command value θgr1 is equal to a target value of a rotation angle of a pinion gear attached to an output shaft of the first turning side motor 33, that is, a pinion absolute angle. The turning side motor angle command value θgr2 is equal to a target value of a rotation angle of a pinion gear attached to an output shaft of the second turning side motor 34, that is, a pinion absolute angle. The command value generator 55b is similar to the command value generator 55a except that the command value generator 55b generates the turning side motor angle command value θgr2 sent to the second turning side controller 54. In description hereinafter, description of a configuration of the command value generator 55b similar to that of the command value generator 55a may be omitted.

Figures 6, 7:
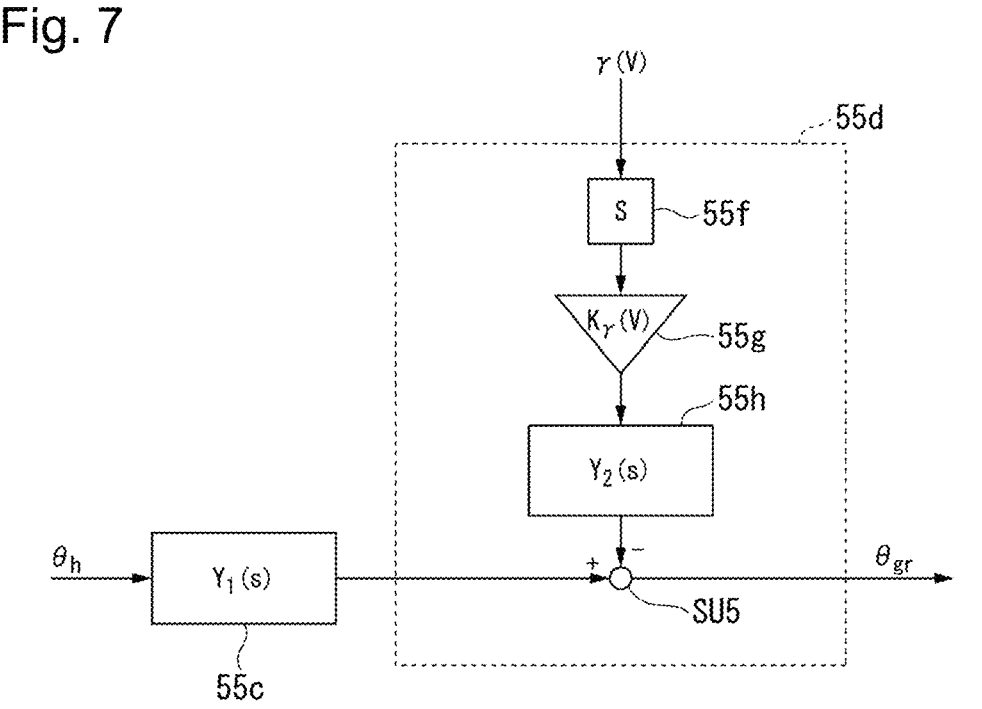
FIG. 6 is a block diagram illustrating a configuration of a command value generator according to the first example embodiment.
FIG. 7 is a block diagram illustrating a configuration of a portion of the command value generator according to the first example embodiment.

As illustrated in FIG. 6, the command value generator 55a includes a yaw rate phase compensation unit 55c, a yaw rate stabilization compensation unit 55d, and a VGR controller 55e. The yaw rate phase compensation unit 55c is a portion that realizes a time constant Tc of a desired transfer characteristic based on a model of a stabilized yaw rate γ(V). The yaw rate γ(V) in a vehicle is a parameter indicating a change in a yaw angle which is a rotation angle in a left-right direction of a vehicle. In other words, the yaw rate γ(V) is an angular velocity when a vehicle rotates in the left-right direction. V is a traveling speed of a vehicle, that is, a vehicle speed. A transfer function Y1(s) of the yaw rate phase compensation unit 55c of a vehicle is expressed by Formula (1) below.

Mathematical formula 1

$$Y_1(s) = \frac{1}{\omega_n^2 G_\theta^\gamma(0)} \frac{(s + \omega_n)^2}{(T_\gamma(V)s + 1)(T_c s + 1)} \tag{1}$$

where s is a Laplace variable, ωn is a natural vibration frequency of the yaw rate γ(V), Gθγ(s) is a transfer function from the steering angle θh to the yaw rate γ(V), Gθγ(0) is a value of Gθγ(s) when s=0, and Tγ(V) is a function of a vehicle speed V and a time constant of Gθγ(s).

The yaw rate stabilization compensation unit 55d approximates a transfer characteristic from the steering angle θh to the yaw rate γ(V) to a first-order transfer characteristic by feedback control that feeds back the first output angle θg1, which is a rotation angle of the first turning side motor 33, so as to stabilize the yaw rate γ(V). The yaw rate γ(V) is input to the yaw rate stabilization compensation unit 55d. As illustrated in FIG. 7, the yaw rate stabilization compensation unit 55d includes a differentiator 55f, a gain adjuster 55g, a compensation unit 55h, and a subtractor SU5. The gain adjuster 55g multiplies a gain Kγ(V) by a value of the yaw rate γ(V) differentiated by the differentiator 55f. Output from the gain adjuster 55g is input to the compensation unit 55h. A transfer function Y2(s) of the compensation unit 55h is expressed by Formula (2) below.

Mathematical formula 2

$$Y_2(s) = \frac{1}{\omega_n^2 G_\theta^\gamma(0)} \frac{1}{T_\gamma(V)s + 1} \tag{2}$$

Output from the compensation unit 55h is input to the subtractor SU5. The subtractor SU5 subtracts output from the compensation unit 55h from output from the yaw rate phase compensation unit 55c. A turning side motor angle command value θgr is output from the subtractor SU5. As illustrated in FIG. 6, the turning side motor angle command value θgr output from the subtractor SU5 is input to the VGR controller 55e.

Here, the transfer function Gθγ(s) from the steering angle θh to the yaw rate γ(V) is expressed by Formula (3) below.

Mathematical formula 3

$$G_\theta^\gamma(s) = G_\theta^\gamma(0) \frac{T_\gamma(V)s + 1}{\frac{s^2}{\omega_n^2} + 2\xi(V)\frac{s}{\omega_n} + 1} \tag{3}$$

where ξ(V) is a function of the vehicle speed V and is an attenuation coefficient of the yaw rate γ(V).

The transfer function Gθγ(s) expressed by Formula (3) above is multiplied by the right term of Formula (2) to obtain Formula (4) below.

Mathematical formula 4

$$\frac{1}{s^2 + 2\xi(V)\omega_n s + \omega_n^2} \tag{4}$$

A transfer function when a value output from the gain adjuster 55g is fed back to Formula (4) above is summarized as the left term of Formula (5) below.

Mathematical formula 5

$$\frac{1}{s^2 + \{2\xi(V) + K_\gamma(V)\}\omega_n s + \omega_n^2} \cong \frac{1}{(s + \omega_n)^2} \tag{5}$$

When {2ξ(V)+Kγ(V)}=2 in the left term of Formula (5) above, the left term of Formula (5) becomes the right term of Formula (5), and a stable transfer function with an attenuation coefficient of 1 is obtained. This shows that the transfer function Gθγ(s) from the steering angle θh to the yaw rate γ(V) can be stabilized as Kγ(V) is determined such that {2ξ(V)+Kγ(V)}=2. In the present example embodiment, while the differentiator 55f and the gain adjuster 55g are provided to feed back a value obtained by multiplying the yaw rate γ(V) by Kr (V) s, the right term of Formula (2) above is put in the yaw rate phase compensation unit 55c and between the gain adjuster 55g and the subtractor SU5 in the yaw rate stabilization compensation unit 55d, so that the transfer function Gθγ(s) is stabilized as the right term of Formula (5).

A portion of the transfer function Y1(s) of the yaw rate phase compensation unit 55c illustrated in Formula (1) excluding the right term of Formula (2) is (s+ωn)2/(Tcs+1). For this reason, a transfer function obtained by combining and putting together the yaw rate phase compensation unit 55c and the yaw rate stabilization compensation unit 55d is 1/(Tcs+1) as a numerator of (s+ωn)2/(Tcs+1) and the right term of Formula (5), that is, a denominator of 1/(s+ωn)2 cancel each other. By the above, a transfer characteristic from the steering angle θh to the yaw rate γ(V) can be approximated to a first-order transfer characteristic. In the present example embodiment, the steering angle θh input to the yaw rate phase compensation unit 55c is converted into a command value of the first output angle θg1 of the first turning side motor 33 by the right term of Formula (2) included in the yaw rate phase compensation unit 55c, and the fed back yaw rate γ(V) is converted into the first output angle θg1 by the compensation unit 55h. For this reason, a value output from the yaw rate stabilization compensation unit 55d is the turning side motor angle command value θgr that is a command value of the first output angle θg1.

Figures 8, 9:
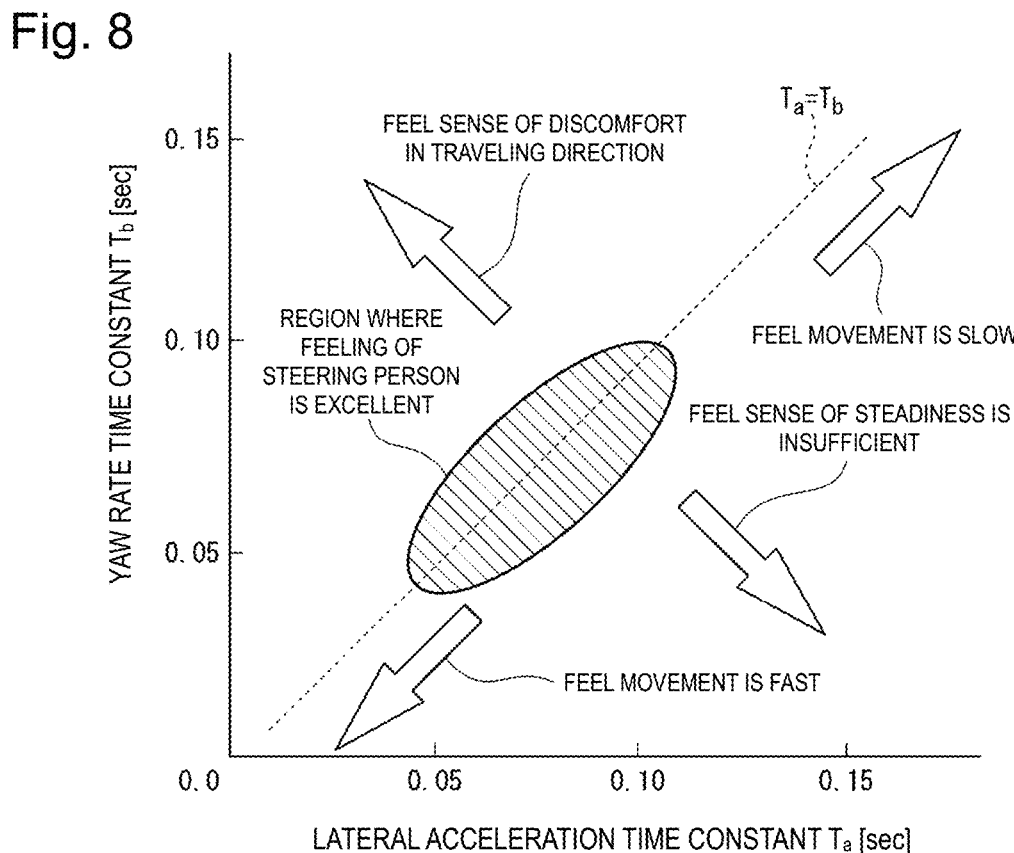
FIG. 8 is a graph illustrating a relationship between a vehicle response characteristic and feeling of a steering operator when steering a vehicle.
FIG. 9 is a block diagram illustrating a configuration of a cooperative controller according to the first example embodiment.

In the yaw rate phase compensation unit 55c, a first-order transfer function approximated as described above, that is, the time constant Tc at 1/(Tcs+1) is set to a desired value by feedforward control. By the above, it is possible to improve steering feeling of a steering operator when steering the steering wheel 11, and the steering operator can easily drive a vehicle. Specifically, the time constant Tc is determined, for example, based on a relationship illustrated in a graph illustrated in FIG. 8. FIG. 8 illustrates a relationship between a vehicle response characteristic and feeling of a steering operator when steering a vehicle. In FIG. 8, the horizontal axis represents a lateral acceleration time constant Ta, and the vertical axis represents a yaw rate time constant Tb. The lateral acceleration time constant Ta is a time constant in a transfer function from the steering angle θh to an acceleration of movement in a lateral direction when a vehicle turns. The yaw rate time constant Tb is a time constant in a transfer function from the steering angle θh to the yaw rate γ(V). For example, the yaw rate phase compensation unit 55c sets a value of the time constant Tc at 1/(Tcs+1) to a value at which a steering operator can easily steer a vehicle based on a relationship of the graph of FIG. 8. For example, the yaw rate phase compensation unit 55c sets a value of the time constant Tc to a value of the yaw rate time constant Tb, which is a "region where feeling of a steering operator is excellent" illustrated in FIG. 8, that is, about 0.04 seconds or more and 0.10 seconds or less. By the above, it is possible to improve feeling felt by a steering operator when steering the steering wheel 11.

The VGR controller 55e is a portion that sets a virtual gear ratio from the first turning side motor 33 to the first turning wheel 21 and adjusts the turning side motor angle command value θgr. As illustrated in FIG. 6, the turning side motor angle command value θgr output from the yaw rate stabilization compensation unit 55d and a self-aligning torque estimation value SATh are input to the VGR controller 55e. The self-aligning torque estimation value SATh is an estimation value of a total value of a self-aligning torque that the turning assembly 20 receives via the first turning wheel 21 and the second turning wheel 22. The self-aligning torque means a torque acting in a direction in which the steering wheel 11 returns by elasticity of the first turning wheel 21 and elasticity of the second turning wheel 22 which are twisted when the steering wheel 11 is steered and an angle of the first turning wheel 21 and the second turning wheel 22 are changed. In the present example embodiment, the self-aligning torque estimation value SATh is a value obtained by adding a first self-aligning torque estimation value SATh1 generated in the first turning wheel 21 estimated by the first turning side controller 53 and a second self-aligning torque estimation value SATh2 generated in the second turning wheel 22 estimated by the second turning side controller 54. The first self-aligning torque estimation value SATh1 is an estimation n value of disturbance including reaction force of the first turning wheel 21. The second self-aligning torque estimation value SATh2 is an estimation value of disturbance including reaction force of the second turning wheel 22. The first self-aligning torque estimation value SATh1 is output from a first model following controller 63 described later. The second self-aligning torque estimation value SATh2 is output from a second model following controller 68 described later.

The VGR controller 55*e* corrects the turning side motor angle command value θgr based on the self-aligning torque estimation value SATh in order to virtually realize that a turning angle is shifted by force received from the first turning wheel 21 and the second turning wheel 22 as in a case where the steering assembly 10 and the turning assembly 20 are mechanically connected. Specifically, the VGR controller 55*e* calculates a corrected turning side motor angle command value θgra based on Formula (6) below.

Mathematical formula 6

$$\theta_{gra} = \left( \theta_{gr} - \frac{SAT_h}{K_s + C_s s} \right) \tag{6}$$

where Ks is a coefficient related to elasticity between the steering assembly 10 and the turning assembly 20 in a case where the steering assembly 10 and the turning assembly 20 are assumed to be mechanically connected, and Cs is a coefficient related to viscosity between the steering assembly 10 and the turning assembly 20 in a case where the steering assembly 10 and the turning assembly 20 are assumed to be mechanically connected.

In a case where the steering assembly 10 and the turning assembly 20 are mechanically connected, when the turning assembly 20 receives a self-aligning torque via the first turning wheel 21 and the second turning wheel 22, the output shaft 13 in the steering assembly 10 rotates according to magnitude of the self-aligning torque. In Formula (6) above, SATh/(Ks+Css) corresponds to an angle at which the output shaft 13 is rotated by a self-aligning torque when a self-aligning torque having a value of SATh is generated in a case where the steering assembly 10 and the turning assembly 20 are mechanically connected. For this reason, by subtracting SATh/(Ks+Css) from the turning side motor angle command value θgr, the turning side motor angle command value θgr can be corrected to a value in a case where the steering assembly 10 and the turning assembly 20 are virtually mechanically connected, that is, the turning side motor angle command value θgra. By the above, in the steer-by-wire steering device 100, steering feeling felt by a steering operator who steers the steering wheel 11 can be made similar to that of a power steering device in which the steering assembly 10 and the turning assembly 20 are mechanically connected. Therefore, for example, it is possible to generate an appropriate time delay in a motion of a vehicle in response to steering of the steering wheel 11, and it is possible to prevent responsiveness from steering of the steering wheel 11 to change in an angle of the first turning wheel 21 and an angle of the second turning wheel 22 from becoming too sensitive. For this reason, it is possible to improve affinity of steering performance in the steering device 100 with respect to a sense of a steering operator, and the steering operator can easily steer the steering wheel 11. Further, by adjusting Ks, which is an elastic element, and Cs, which is a viscosity element, it is possible to optionally set elasticity and viscosity between the steering assembly 10 and the turning assembly 20 that are virtually connected. For this reason, by adjusting Ks and Cs to values at which a steering operator can easily perform steering, the steering operator can more easily steer the steering wheel 11.

The VGR controller 55*e* calculates a turning side motor angle command value θgra1 by multiplying the turning side motor angle command value θgra calculated from Formula (6) above by a variable gear ratio VGR (θgra, V). That is, θgra1=θgra·VGR (θgra, V) holds. The variable gear ratio VGR (θgra, V) is a gear ratio virtually set from the first turning side motor 33 to the first turning wheel 21, and is a variable that changes according to the turning side motor angle command value θgra and the vehicle speed V. The variable gear ratio VGR (θgra, V) is appropriately set according to how to change an angle of the first turning wheel 21 with respect to the steering angle θh when the steering wheel 11 is steered.

Here, a rotation angle of the first turning side motor 33, that is, the first output angle θg1 and an angle (turning angle) of the first turning wheel 21 do not have a linear relationship, and an amount of change in an angle of the first turning wheel 21 varies depending on magnitude of the first output angle θg1. Specifically, for example, as the first output angle θg1 is larger, an angle of the first turning wheel 21 is less likely to change. For this reason, when the turning side motor angle command value θgra is simply input to the first turning side motor 33, an amount of change in an angle of the first turning wheel 21 changes depending on a rotation angle of the steering wheel 11, that is, magnitude of the steering angle θh, and there is a possibility that it becomes difficult for a steering operator to steer the steering wheel 11.

On the other hand, for example, by setting the variable gear ratio VGR (θgra, V) as a variable by which a relationship between the turning side motor angle command value θgra obtained based on the steering angle θh and an angle of the first turning wheel 21 becomes linear, it is possible to change an angle of the first turning wheel 21 in proportion to a rotation angle (the steering angle θh) of the steering wheel 11. By the above, a steering operator can easily steer the steering wheel 11.

Further, for example, in a case where a traveling direction of a vehicle is rapidly changed as the steering wheel 11 is significantly rotated, there is a case where an angle of the first turning wheel 21 is preferably more significantly changed as a rotation angle of the steering wheel 11 is larger. In such a case, the variable gear ratio VGR (θgra, V) is set as a variable by which, in a case where the turning side motor angle command value θgra is equal to or more than a certain magnitude, an amount of change in an angle of the first turning wheel 21 becomes larger with respect to an amount of change in the turning side motor angle command value θgra as the turning side motor angle command value θgra becomes larger, so that an angle of the first turning wheel 21, that is, a turning angle can be changed more significantly in a case where the steering wheel 11 is rotated rapidly and significantly. By the above, for example, in a case where a steering operator rapidly changes a traveling direction of a vehicle to perform an emergency avoidance action, a traveling direction of the vehicle can be suitably changed.

The turning side motor angle command value θgra1 output from the VGR controller 55*e* is an output value output from the command value generator 55*a*. As illustrated in FIG. 5, the turning side motor angle command value θgra1 is input to the first turning side controller 53.

The command value generator 55*b* generates a turning side motor angle command value θgra2 input to the second turning side controller 54, similarly to the command value generator 55*a* described above. The turning side motor angle command value θgra2 is a command value of the second output angle θg2 that is a rotation angle of the second turning side motor 34.

The cooperative controllers 56*a* and 56*b* perform calculation for cooperatively controlling the first turning side motor 33 and the second turning side motor 34. In description hereinafter, the cooperative controller 56*a* will be described as a representative of the cooperative controllers 56a and 56b, and description of the same configuration as the cooperative controller 56a in the cooperative controller 56b may be omitted.

As illustrated in FIG. 9, the cooperative controller 56a includes a compensation torque calculation unit 56c and a frequency domain setter 56d. The compensation torque calculation unit 56c receives input of the first self-aligning torque estimation value SATh1 output from the first turning side controller 53 and the second self-aligning torque estimation value SATh2 output from the second turning side controller 54.

A total value of the first self-aligning torque estimation value SATh1 and the second self-aligning torque estimation value SATh2, that is, the self-aligning torque estimation value SATh can be regarded as a total value of a torque necessary for driving the turning assembly 20, and can be regarded as a total value of a motor torque necessary to be output by two motors, the first turning side motor 33 and the second turning side motor 34. Here, the first self-aligning torque estimation value SATh1 including reaction force of the first turning wheel 21 can be regarded as a value of a motor torque required in the first turning side motor 33 closer to the first turning wheel 21 than the second turning side motor 34. The second self-aligning torque estimation value SATh2 including reaction force of the second turning wheel 22 can be regarded as a value of a motor torque required in the second turning side motor 34 closer to the second turning wheel 22 than the first turning side motor 33. Since reaction force received from the first turning wheel 21 and reaction force received from the second turning wheel 22 are often different from each other, the first self-aligning torque estimation value SATh1 and the second self-aligning torque estimation value SATh2 are often different from each other. In this case, a motor torque of the first turning side motor 33 and a motor torque of the second turning side motor 34 are different from each other. For this reason, motor torque bias occurs between the first turning side motor 33 and the second turning side motor 34, a load on one turning side motor becomes larger than that on another turning side motor, and a heat value of the another turning side motor may become larger than a heat value of the one turning side motor.

Since a total torque obtained by adding the first self-aligning torque estimation value SATh1 and the second self-aligning torque estimation value SATh2, that is, the self-aligning torque estimation value SATh only needs to be able to be output by two turning side motors, in order to eliminate bias between a motor torque of the first turning side motor 33 and a motor torque of the second turning side motor 34, each of the motor torques of the turning side motors only needs to be a half value of the total torque of the first self-aligning torque estimation value SATh1 and the second self-aligning torque estimation value SATh2. That is, when a motor torque of the first turning side motor 33 is TSM1 and a motor torque of the second turning side motor 34 is TSM2, TSM1=TSM2=(SATh1+SATh2)/2 only needs to hold. When Tm1 is a correction interference torque necessary for correcting the first self-aligning torque estimation value SATh1 and the second self-aligning torque estimation value SATh2 to a half value of a total torque of the first self-aligning torque estimation value SATh1 and the second self-aligning torque estimation value SATh2, (SATh1+SATh2)/2=SATh1−Tm1=SATh2+Tm1 holds. Therefore, Tm1=(SATh1−SATh2)/2. The compensation torque calculation unit 56c calculates the correction interference torque Tm1 from the relational expression. By subtracting the correction interference torque Tm1 from a motor torque of the first turning side motor 33 and adding the correction interference torque Tm1 to a motor torque of the second turning side motor 34, it is possible to eliminate bias between the motor torque of the first turning side motor 33 and the motor torque of the second turning side motor 34.

The frequency domain setter 56d sets a frequency domain for cooperatively controlling the first turning side motor 33 and the second turning side motor 34. The frequency domain setter 56d converts the correction interference torque Tm1 output from the compensation calculation unit 56c into a correction interference torque Tm2 and outputs the correction interference torque Tm2 to the first turning side controller 53. In the present example embodiment, the frequency domain setter 56d is a low-pass filter. The correction interference torque Tm2 output from the frequency domain setter 56d is expressed by Formula (7) below.

Mathematical formula 7

$$T_{m2}(s) = \frac{\omega_1}{s + \omega_1} T_{m1}(s) \qquad (7)$$

Note that Tm1(s) is the correction interference torque Tm1 that is Laplace transformed, Tm2(s) is the correction interference torque Tm2 that is Laplace transformed, and ω1 is a cutoff frequency of frequency domain setter 56d that is a low-pass filter.

Figure 10:
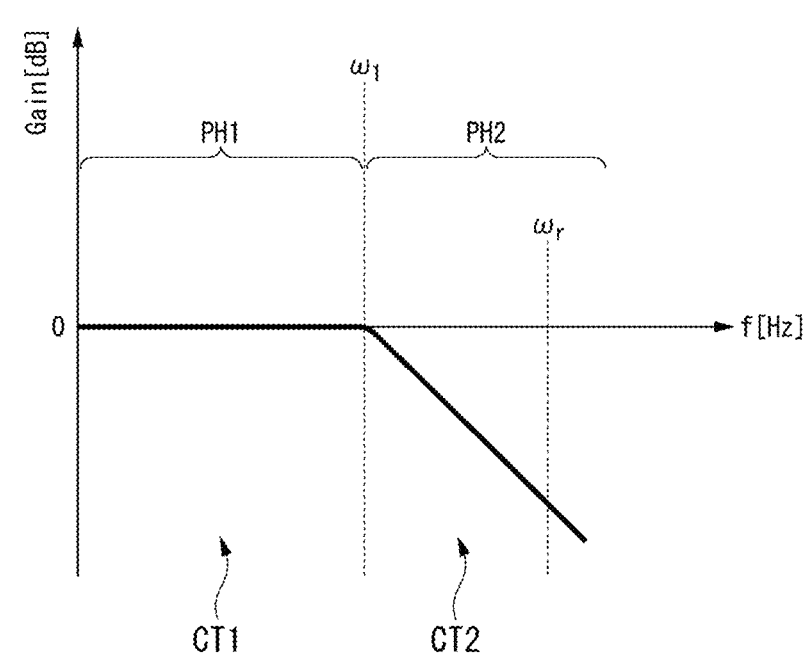
FIG. 10 is a graph illustrating a gain characteristic of a frequency domain setter according to the first example embodiment.

The frequency domain setter 56d is a low-pass filter having a characteristic illustrated in FIG. 10. In FIG. 10, the vertical axis represents a gain [dB] in the frequency domain setter 56d, and the horizontal axis represents a steering frequency f [Hz]. The steering frequency f is a frequency of the steering angle θh that changes when the steering wheel 11 is steered. As illustrated in FIG. 10, the cutoff frequency ω1 is lower than a mechanical resonance frequency or in the steering device 100. The resonance frequency ωr is, for example, about 10 Hz or more and 50 Hz or less. The cutoff frequency ω1 is, for example, about 1 Hz or more and 5 Hz or less. In a domain where the steering frequency f is equal to or less than the cutoff frequency ω1, a gain in the frequency domain setter 56d is 0 dB, that is, a gain in a transfer function of the frequency domain setter 56d is approximately one. For this reason, in a domain of the cutoff frequency ω1 or less, Tm2=Tm1. In a domain where the steering frequency f is higher than the cutoff frequency ω1, a gain in the frequency domain setter 56d is smaller than 1, and Tm2<Tm1. In a domain where the steering frequency f is higher than the cutoff frequency ω1, a gain is smaller as the steering frequency f is higher. For this reason, as the steering frequency f is higher, the correction interference torque Tm2 output from the cooperative controller 56a to the first turning side controller 53 becomes smaller.

As described above, the cooperative controller 56a generates the correction interference torque Tm2 based on the first self-aligning torque estimation value SATh1 that is a value output from the first model following controller 63 to be described later and the second self-aligning torque estimation value SATh2 that is a value output from the second model following controller 68 to be described later. In the present example embodiment, the cooperative controller 56a generates, as the correction interference torque Tm2, a value that is half a difference between the first self-aligning torque estimation value SATh1 and the second self-aligning torque estimation value SATh2, that is, a value obtained by performing low-pass filter processing on the correction interference torque Tm1. The first self-aligning torque estimation value SATh1 corresponds to a "first estimation value". The second self-aligning torque estimation value SATh2 corresponds to a "second estimation value".

The cooperative controller 56b generates the correction interference torque Tm2 similarly to the cooperative controller 56a. A value of the correction interference torque Tm2 output from the cooperative controller 56b is the same as a value of the correction interference torque Tm2 output from the cooperative controller 56a. In description hereinafter, the correction interference torque Tm2 output from the cooperative controller 56a may be referred to as a correction interference torque Tm2R, and the correction interference torque Tm2 output from the cooperative controller 56b may be referred to as a correction interference torque Tm2L.

The steering reaction force controllers 57a and 57b control steering reaction force transmitted to a steering operator via the steering wheel 11. As illustrated in FIG. 5, the steering angle θh is input to each of the steering reaction force controllers 57a and 57b. The steering reaction force controller 57a controls the first steering side motor 31. The steering reaction force controller 57b controls the second steering side motor 32. The steering reaction force controller 57a sends a half value of desired steering reaction force as a command value to the first steering side motor 31 to control the first steering side motor 31. The steering reaction force controller 57b sends a half value of desired steering reaction force as a command value to the second steering side motor 32 to control the second steering side motor 32. The first steering side motor 31 and the second steering side motor 32 are controlled by the steering reaction force controllers 57a and 57b, respectively, and the output shaft 13 is rotated by the two steering side motors, so that steering reaction force applied to a steering operator via the steering wheel 11, that is, the steering torque Th is adjusted to a desired value. The steering reaction force controller 57a and the steering reaction force controller 57b have the same configuration except that the steering side motor to be controlled is different. For this reason, in description hereinafter, the steering reaction force controller 57a will be described as a representative of the steering reaction force controllers 57a and 57b, and description of the same configuration as the steering reaction force controller 57a in the steering reaction force controller 57b may be omitted.

Figure 11:
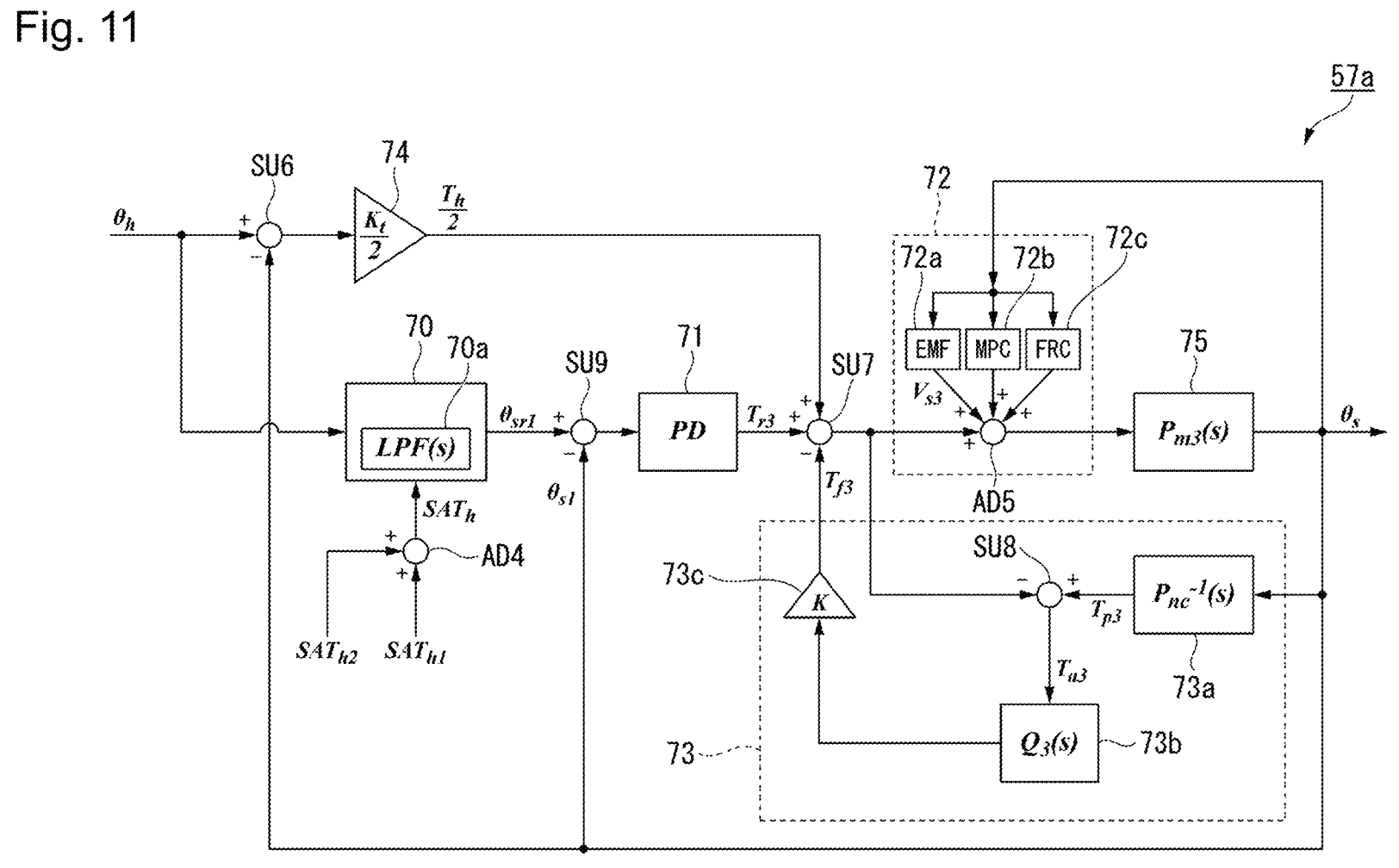

As illustrated in FIG. 11, the steering reaction force controller 57a includes a steering reaction force setter 70, an angle controller 71, a state feedback unit 72, a third model following controller 73, a torque conversion unit 74, subtractors SU6, SU7, SU8, and SU9, and an adder AD4.

The steering reaction force setter 70 sets a target steering reaction force. The steering angle θh and the self-aligning torque estimation value SATh are input to the steering reaction force setter 70. The self-aligning torque estimation value SATh is calculated as the first self-aligning torque estimation value SATh1 and the second self-aligning torque estimation value SATh2 are added in the adder AD4, and is input to the steering reaction force setter 70.

The steering reaction force setter 70 includes a low-pass filter 70a. The low-pass filter 70a removes at least a portion of a component having a frequency higher than a predetermined cutoff frequency from the self-aligning torque estimation value SATh input to the steering reaction force setter 70. The predetermined cutoff frequency is, for example, about 10 Hz. A frequency of a self-aligning torque SAT is about 10 Hz or less. For this reason, as at least a portion of a component having a frequency higher than 10 Hz is removed from the self-aligning torque estimation value SATh by the low-pass filter 70a, accuracy of the self-aligning torque estimation value SATh can be further improved. A component having a frequency higher than 10 Hz included in the self-aligning torque estimation value SATh input to the steering reaction force setter 70 includes, for example, a component due to reaction force of a vehicle motion or the like. In the present example embodiment, the steering reaction force setter 70 distinguishes reaction force of a vehicle motion and tire contact information, that is, the self-aligning torque SAT, in a frequency domain by the low-pass filter 70a, and sets a target steering reaction force by using the self-aligning torque estimation value SATh with higher accuracy.

In the present example embodiment, as the output angle θs of the output shaft 13 is adjusted by the first steering side motor 31 and the second steering side motor 32, a difference in a rotation angle between the input shaft 12 and the output shaft 13 connected by the torsion bar 14 is adjusted, and steering reaction force, that is, the steering torque Th is controlled. For this reason, the steering reaction force setter 70 calculates a target value of the output angle θs of the output shaft 13 necessary for setting the steering torque Th to a target value. Here, the steering torque Th is expressed by Formula (8) below.

Mathematical formula 8

$$T_h = K_t(\theta_h - \theta_s) \tag{8}$$

where Kt is a spring constant of the torsion bar 14.

When a target value of the steering torque Th is Thr and a target value of the output angle θs is θsr, the output angle target value θsr is expressed by Formula (9) below from above (8).

Mathematical formula 9

$$\theta_{sr} = \theta_h - \frac{T_{hr}}{K_t} \tag{9}$$

Figure 12A:
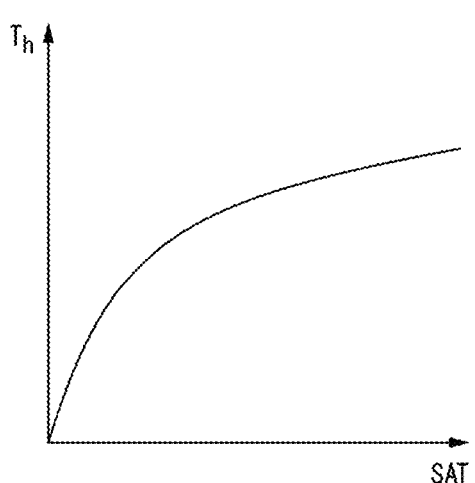
FIG. 12A is a graph illustrating an example of a relationship between steering torque and self-aligning torque.
Figure 12B:
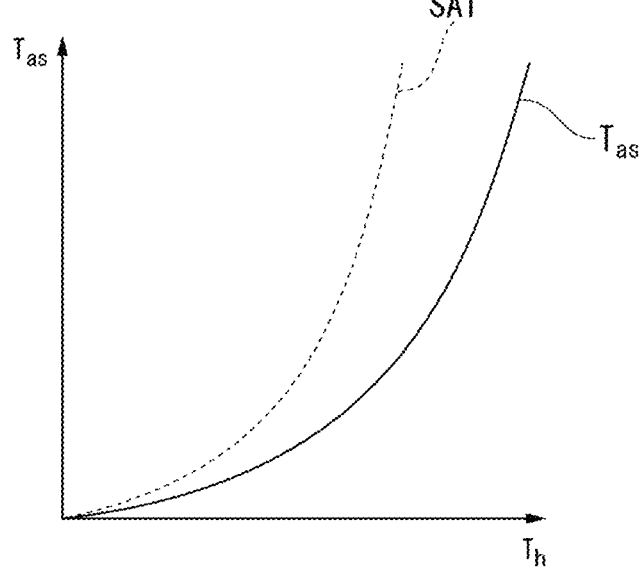
FIG. 12B is a graph illustrating an example of a relationship between assist torque and steering torque.

Here, a relationship between the steering torque Th and the self-aligning torque SAT can be expressed as a graph illustrated in FIG. 12A, for example. In FIG. 12A, the horizontal axis represents the self-aligning torque SAT, and the vertical axis represents the steering torque Th. For example, in an electric power steering device in which a steering assembly and a turning assembly are mechanically connected, a value obtained by adding the steering torque Th and an assist torque Tas output from the electric power steering device can be regarded as substantially equal to the self-aligning torque SAT. A relationship between the assist torque Tas and the steering torque Th can be expressed, for example, as a graph illustrated in FIG. 12B. In FIG. 12B, the horizontal axis represents the steering torque Th, and the vertical axis represents the assist torque Tas. From a relationship of SAT≈Th+Tas, a curve formed by adding the steering torque Th to a curve of the assist torque Tas illustrated in FIG. 12B is a curve of the self-aligning torque SAT indicated by a broken line in FIG. 12B. By the above, a graph showing a relationship between the self-aligning torque SAT and the steering torque Th shown in FIG. 12A is obtained.

The steering reaction force setter 70 calculates a value of the steering torque Th corresponding to an input value of the self-aligning torque estimation value SATh as the steering torque target value Thr based on a relationship illustrated in the graph of FIG. 12A. The steering reaction force setter 70 substitutes the calculated steering torque target value Thr and the input steering angle θh into Formula (9) above to calculate the output angle target value θsr. As illustrated in FIG. 11, the output angle target value θsr is input to the subtractor SU9. The subtractor SU9 subtracts a value of the current output angle θs from the output angle target value θsr and outputs the subtracted value to the angle controller 71.

By performing PD control, the angle controller 71 outputs a difference between the output angle target value θsr and the output angle θs input from the subtractor SU9 as a third input torque Tr3 input to a third control target 75. The third control target 75 is a control target including the first steering side motor 31. A transfer function Pm3($s$) of the third control target 75 is expressed by, for example, Formula (10) below.

Mathematical formula 10

$$P_{m3} = \frac{1}{J_{m3}s^2 + B_{m3}s} \tag{10}$$

Here, s is a Laplace variable, Jm3 is a parameter corresponding to the moment of inertia of the first steering side motor 31, and Bm3 is a parameter corresponding to a viscous friction coefficient of the first steering side motor 31.

A PD gain in the angle controller 71 is adjusted to a value at which a value of a torque output from the angle controller 71 is output as a half value of the steering torque target value Thr. That is, the third input torque Tr3 output from the angle controller 71 is equal to Thr/2. The third input torque Tr3 output from the angle controller 71 is input to the subtractor SU7. The subtractor SU7 subtracts a third correction torque Tf3 output from the third model following controller 73 from the third input torque Tr3. Further, the subtractor SU7 adds a half value of the current steering torque Th, that is, Th/2 to the third input torque Tr3. The value of Th/2 is calculated by multiplying a value output from the subtractor SU6 by a gain Kt/2 of the torque conversion unit 74. The steering angle θh is input to the subtractor SU6. The subtractor SU6 subtracts the output angle θs from the steering angle θh and outputs a result to the torque conversion unit 74. By the above, a half value of the steering torque Th, that is, Th/2 can be calculated based on the relationship of Formula (8) described above.

Force generated by the torsion bar 14 being twisted is dispersed and applied as reaction force to the first steering side motor 31 and the second steering side motor 32. A torque of half the steering torque Th is applied from the torsion bar 14 to each of the first steering side motor 31 and the second steering side motor 32. For this reason, as described above, reaction force received by the first steering side motor 31 from the torsion bar 14 can be compensated by adding a value of Th/2 to the third input torque Tr3.

Output from the subtractor SU7 is input to an adder AD5 and the third model following controller 73. The adder AD5 outputs a value obtained by adding output from the state feedback unit 72 to output from the subtractor SU7 to the third control target 75.

In the present example embodiment, the third model following controller 73 is a model following controller configured to perform model following control. The third model following controller 73 generates the third correction torque Tf3 for correcting the third input torque Tr3 based on output of the third control target 75 and a third nominal model NM3. In the present example embodiment, the third correction torque Tf3 is a feedback torque fed back to the third input torque Tr3. The third nominal model NM3 is an internal model used as a model that restricts the third control target 75 when the third control target 75 is controlled.

In the present example embodiment, the third model following controller 73 generates the third correction torque Tf3 based on the output angle θs, and feeds back the third correction torque Tf3 to the third input torque Tr3. The third model following controller 73 includes a third inverse nominal model 73a, a filter 73b, and the subtractor SU8.

When a transfer function of the filter 73b is Q3($s$), the third model following controller 73 is configured such that the transfer function Pm3($s$) of the third control target 75 is restricted to a transfer function Pnc(s) of the third nominal model NM3 in a frequency band in which a gain in a gain characteristic of Q3($s$) is approximately one. In the present example embodiment, Q3($s$) is equal to a complementary sensitivity function T3($s$) of an inner loop including the third model following controller 73. Q3($s$), that is, in the complementary sensitivity function T3($s$), a gain is approximately 0 dB, that is, a gain in a transfer function is approximately one, for example, in a frequency band allowed by the filter 73b to pass.

Note that, in the present description, that "a transfer function of a control target is restricted to a transfer function of a nominal model" means that, for example, a control target is controlled such that a transfer function of the control target appears to be a transfer function of a nominal model apparently when an input and output relationship is viewed. Further, in the present description, that "a gain is approximately one" includes, for example, a case where the gain is 0.8 or more and 1.2 or less in addition to a case where the gain is one. The numerical range is, for example, a range in which a gain of a substantial disturbance reduction characteristic can be adjusted to 1 in consideration of positive efficiency and reverse efficiency of a worm gear in a case where a speed reduction mechanism connected to each motor includes the worm gear. Since efficiency of a worm gear is about 0.8, it is necessary to adjust a gain by ±0.2 with respect to a target value of 1.

The third inverse nominal model 73a is an inverse model of the third nominal model NM3 used to restrict the third control target 75. The transfer function Pnc(s) of the third nominal model NM3 is expressed by, for example, Formula (11) below. A transfer function Pnc-1($s$) of the third inverse nominal model 73a is expressed by Formula (12) below.

Mathematical formula 11

$$P_{nc}(s) = \frac{1}{J_{n3}s^2 + B_{n3}s} \frac{s^2 + \alpha_{b3}s + \alpha_{k3}}{s^2 + \beta_{b3}s + \beta_{k3}} \tag{11}$$

$$J_{n3} = J_{m3}, B_{n3} = \frac{B_{m3}}{G_3}, \alpha_{b3} = \frac{B_h}{G_3^2 J_h}$$

$$\alpha_{k3} = \frac{K_t}{G_3^2 J_h}, \beta_{b3} = \frac{B_h}{J_h}, \beta_{k3} = \frac{K_t}{J_h}$$

Mathematical formula 12

$$P_{nc}^{-1}(s) = \left(J_{n3}s^2 + B_{n3}s\right) \frac{s^2 + \beta_{b3}s + \beta_{k3}}{s^2 + \alpha_{b3}s + \alpha_{k3}} \tag{12}$$

Here, s is a Laplace variable, Jm3 is a parameter corresponding to the moment of inertia of the first steering side motor 31, Bm3 is a parameter corresponding to a viscous friction coefficient of the first steering side motor 31, Jh is a parameter corresponding to the moment of inertia of the steering wheel 11, Bh is a parameter corresponding to a viscous friction coefficient of the steering wheel 11, Kt is a spring constant of the torsion bar 14, and G3 is a parameter corresponding to a gear ratio from the first steering side motor 31 to the steering wheel 11.

Output of the third control target 75 is input to the third inverse nominal model 73a. Specifically, the output angle θs is input to the third inverse nominal model 73a. The third inverse nominal model 73a outputs a torque Tp3 based on Formula (12) above and the input output angle θs. The torque Tp3 is equal to a value of a torque input to the third nominal model NM3 in a case where an output value of the third nominal model NM3 is the same value as an output value of the third control target 75.

The subtractor SU8 subtracts output of the subtractor SU7 from output of the third inverse nominal model 73a to generate a differential torque Ta3. The differential torque Ta3 output from the subtractor SU8 is subjected to filter processing by the filter 73b and input to the gain adjuster 73c. The gain adjuster 73c calculates the third correction torque Tf3 by multiplying an output value from the filter 73b by a feedback gain K, and outputs the third correction torque Tf3 to the subtractor SU7.

The state feedback unit 72 feeds back a state compensation value Vs3 to the third input torque Tr3 so that an apparent transfer function of the third control target 75 approaches the transfer function Pnc(s) of the third nominal model NM3 based on output of the third control target 75. The apparent transfer function of the third control target 75 is, for example, a transfer function of one portion in a case where a portion located inside a feedback loop formed by the third model following controller 73 is regarded as the one portion. Specifically, in the present example embodiment, the apparent transfer function of the third control target 75 is a transfer function of an entire portion from the subtractor SU7 to output of the third control target 75, and is a transfer function of a portion combining the state feedback unit 72 and the third control target 75. In the present example embodiment, the state feedback unit 72 feeds back the state compensation value Vs3 to the third input torque Tr3 after being corrected by the third correction torque Tf3 and before being input to the third control target 75.

The state compensation value Vs3 includes a compensation value for compensating at least a portion of inertial force generated in the third control target 75, viscous force generated in the third control target 75, and frictional force generated in the third control target 75. More specifically, the state compensation value Vs3 includes a compensation value for compensating at least a portion of inertial force generated in the first steering side motor 31, viscous force generated in the first steering side motor 31, and frictional force generated in the first steering side motor 31. In the present example embodiment, the state compensation value Vs3 is a compensation value including inertial force generated in the first steering side motor 31, viscous force generated in the first steering side motor 31, and frictional force generated in the first steering side motor 31.

The state feedback unit 72 includes an inertia compensator 72a, a viscosity compensator 72b, and a friction compensator 72c. The inertia compensator 72a calculates a compensation value for compensating at least a portion of inertial force generated in the first steering side motor 31 based on the output angle θs of the output shaft 13 rotated by the first steering side motor 31. The viscosity compensator 72b calculates a compensation value for compensating at least a portion of viscous force generated in the first steering side motor 31 based on the output angle θs. The friction compensator 72c calculates a compensation value for compensating at least a portion of frictional force generated in the first steering side motor 31 based on the output angle θs. In the present example embodiment, the state compensation value Vs3 includes a compensation value calculated by the inertia compensator 72a, a compensation value calculated by the viscosity compensator 72b, and a compensation value calculated by the friction compensator 72c. A compensation value calculated by the inertia compensator 72a, a compensation value calculated by the viscosity compensator 72b, and a compensation value calculated by the friction compensator 72c are output to the adder AD5 and added to the third input torque Tr3 after corrected by the third correction torque Tf3.

As the state compensation value Vs3 is added by the state feedback unit 72, inertia, viscosity, and friction in a steering system including the steering wheel 11 and the first steering side motor 31 can be adjusted to a desired value, and steering reaction force that a steering operator receives from the steering wheel 11 can be adjusted to a value that facilitates steering. Therefore, steering feeling felt by a steering operator can be further improved.

Further, as the state feedback unit 72 is provided, the third control target 75 to be controlled by feedback by the third model following controller 73 can be apparently brought close to the third nominal model NM3 included as an internal model. By the above, when model following control is performed by the third model following controller 73, the third control target 75 can be regarded as a model close to the third nominal model NM3, and a modeling error between the third control target 75 and the third nominal model NM3 can be reduced. Therefore, it is possible to widen a frequency band in which the transfer function Pm3(s) of the third control target 75 can be restricted to the transfer function Pnc(s) of the third nominal model NM3 when a gain in a gain characteristic of Q3(s) is approximately one. For this reason, model following control by the third model following controller 73 can be performed in a wider frequency band, and steering feeling felt by a steering operator can be further improved.

In the present example embodiment, in each of the steering reaction force controller 57a and the steering reaction force controller 57b, the third input torque Tr3 output from the angle controller 71 is set to Thr/2, an output angle of the first steering side motor 31 and an output angle of the second steering side motor 32 are controlled by model following control, and the output angle θs of the output shaft 13 is controlled to an angle at which the steering torque target value Thr as a target can be output. By the above, steering reaction force transmitted to a steering operator can be adjusted to a suitable value.

The first turning side controller 53 controls a first control target 65a including the first turning side motor 33 based on the turning side motor angle command value θgra1 input from the first steering side controller 51. The second turning side controller 54 controls a second control target 65b including the second turning side motor 34 based on the turning side motor angle command value θgra2 input from the second steering side controller 52. In description hereinafter, the first turning side controller 53 will be described as a representative of the first turning side controller 53 and the second turning side controller 54, and description of the same configuration as the first turning side controller 53 in the second turning side controller 54 may be omitted.

As illustrated in FIG. 4A, the first turning side controller 53 includes the first processor 53a and a plurality of inverter circuits 58. A plurality of the inverter circuits 58 independently supply power to the coil groups 37 of a plurality of systems in the first turning side motor 33. For this reason, redundancy of the first turning side controller 53 and redundancy of the first turning side motor 33 can be ensured. That is, even if a failure occurs in any one of a plurality of the inverter circuits 58 and power cannot be supplied to a certain one of the coil groups 37, power can be supplied to another one of the coil groups 37 by another one of the inverter circuits 58, and the first turning side motor 33 can be suitably driven.

In the present example embodiment, the inverter circuit 58 is provided with two inverter circuits, a first inverter circuit 58a and a second inverter circuit 58b. The first inverter circuit 58a independently supplies power to the first coil group 37a in the first turning side motor 33. The second inverter circuit 58b independently supplies power to the second coil group 37b in the first turning side motor 33.

As illustrated in FIG. 4B, the second turning side controller 54 includes the second processor 54a and a plurality of inverter circuits 59. A plurality of the inverter circuits 59 independently supply power to the coil groups 37 of a plurality of systems in the second turning side motor 34. By the above, similarly to the first turning side controller 53 and the first turning side motor 33, redundancy of the second turning side controller 54 and redundancy of the second turning side motor 34 can be ensured. In the present example embodiment, the inverter circuit 59 is provided with two inverter circuits, a first inverter circuit 59a and a second inverter circuit 59b. The first inverter circuit 59a independently supplies power to the first coil group 37a in the second turning side motor 34. The second inverter circuit 59b independently supplies power to the second coil group 37b in the second turning side motor 34.

The first processor 53a and the second processor 54a are a semiconductor integrated circuit, and are also referred to as a central processing unit (CPU) or a microprocessor. The first processor 53a and the second processor 54a sequentially execute, for example, a computer program that is stored in a ROM (not illustrated) and that describes a command group for controlling motor drive, so as to implement desired processing.

Figure 13:
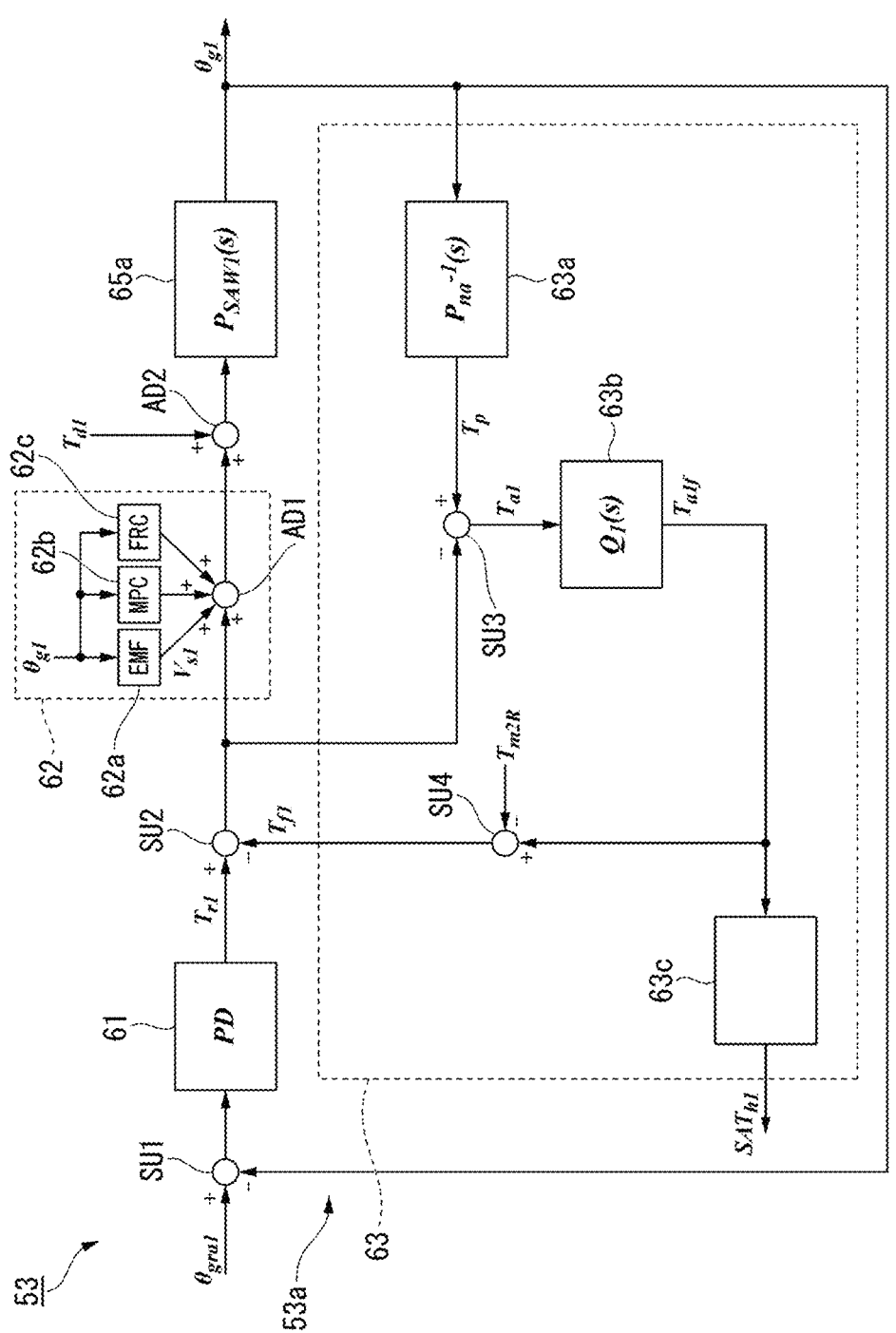
FIG. 13 is a block diagram illustrating a configuration of a portion of the first turning side controller in the first example embodiment.

As illustrated in FIG. 5, the turning side motor angle command value θgra1 and the correction interference torque Tm2R are input to the first processor 53a. As illustrated in FIG. 13, the first processor 53a includes an angle controller 61, a state feedback unit 62, the first model following controller 63, subtractors SU1 and SU2, and adders AD1 and AD2. That is, the first turning side controller 53 includes the angle controller 61, the state feedback unit 62, the first model following controller 63, the subtractors SU1 and SU2, and the adders AD1 and AD2. The turning side motor angle command value θgra1 input to the first processor 53a is input to the subtractor SU1. The subtractor SU1 subtracts the first output angle θg1 of the first turning side motor 33 from the turning side motor angle command value θgra1, and outputs a subtraction result to the angle controller 61. By performing PD control, the angle controller 61 calculates a first input torque Tr1 from a value of an angle input from the subtractor SU1 and outputs the first input torque Tr1 to the subtractor SU2.

The subtractor SU2 subtracts a correction torque Tf1 output from the first model following controller 63 from the first input torque Tr1. Output from the subtractor SU2 is input to the adder AD1 and the first model following controller 63. The adder AD1 outputs a value obtained by adding output from the state feedback unit 62 to output from the subtractor SU2 to the adder AD2. The adder AD2 outputs a value obtained by adding a disturbance torque Td1 to output from the adder AD1 to the first control target 65a. In the present example embodiment, the first control target 65a includes the first turning side motor 33, the first turning wheel 21, and the bushings 23d, 23e, 41a, and 42a provided in the turning assembly 20. In the present example embodiment, the first control target 65a includes a portion from the first turning side motor 33 to the first turning wheel 21 of a vehicle. Output of the first control target 65a is the first output angle θg1 of the first turning side motor 33.

Figure 14:
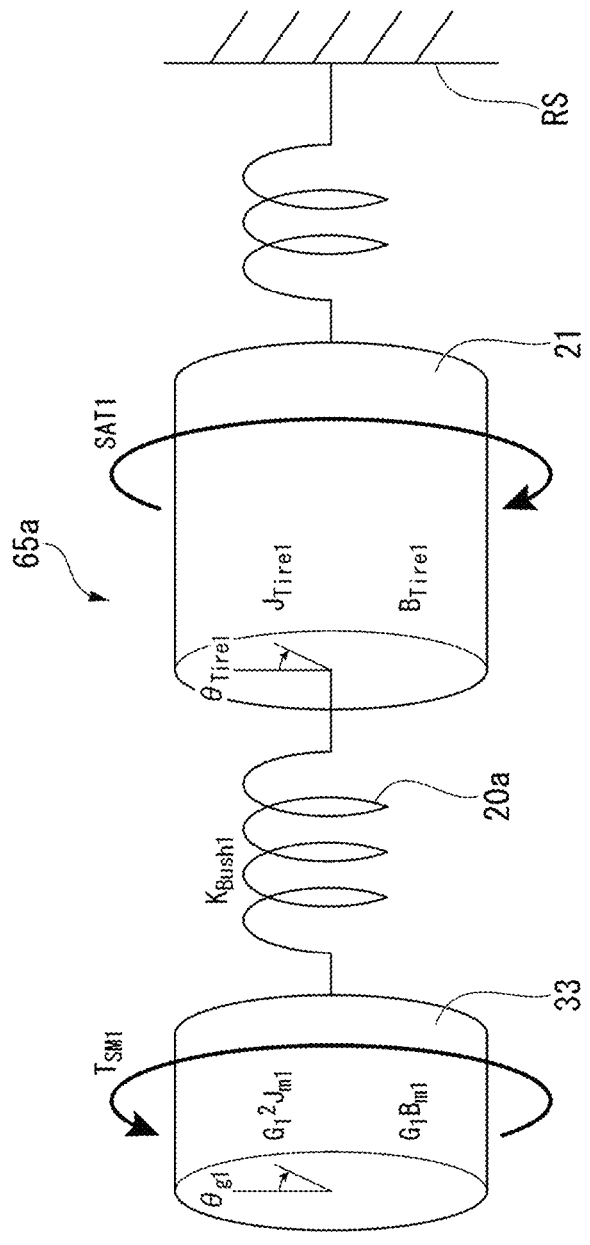
FIG. 14 is a diagram illustrating a simplified model of a first control target in the first example embodiment.

As illustrated in FIG. 14, the first control target 65a can be shown by a simplified model in which the first turning side motor 33 and the first turning wheel 21 are connected by a virtual spring 20a. In FIG. 14, a spring constant KBush1 of the virtual spring 20a is a parameter corresponding to an equivalent spring constant of an elastic element including each of the bushings 23d, 23e, 41a, and 42a included in the first control target 65a. The spring constant KBush1 also includes rigidity of a vehicle body. θTire1 illustrated in FIG. 14 is an angle of the first turning wheel 21.

In the present example embodiment, the first model following controller 63 is a model following controller configured to perform model following control. As illustrated in FIG. 13, the first model following controller 63 generates the correction torque Tf1 for correcting the first input torque Tr1 input to the first control target 65a based on output of the first control target 65a and a first nominal model NM1 based on a configuration of the first control target 65a. In the present example embodiment, the correction torque Tf1 is a feedback torque fed back to the first input torque Tr1. The first nominal model NM1 is an internal model used as a model that restricts the first control target 65a when the first control target 65a is controlled.

In the present example embodiment, the first model following controller 63 generates the correction torque Tf1 based on the first output angle θg1 of the first turning side motor 33, and feeds back the correction torque Tf1 to the first input torque Tr1. The first model following controller 63 includes a first inverse nominal model 63a, a filter 63b, a noise removal filter 63c, and subtractors SU3 and SU4.

When a transfer function of the filter 63b is Q1(s), the first model following controller 63 is configured such that a transfer function PSAW1(s) of the first control target 65a is restricted to a transfer function Pna(s) of the first nominal model NM1 in a frequency band in which a gain in a gain characteristic of Q1(s) is approximately one. In the present example embodiment, Q1(s) is equal to a complementary sensitivity function T1(s) of an inner loop including the first model following controller 63.

The first inverse nominal model 63a is an inverse model of the first nominal model NM1 used to restrict the first control target 65a. In the present example embodiment, the transfer function Pna(s) of the first nominal model NM1 is expressed by Formula (13) below. A transfer function Pna-1(s) of the first inverse nominal model 63a is expressed by Formula (14) below.

Mathematical formula 13

$$P_{na}(s) = F_{na}(s) = \frac{1}{J_{n1}s^2 + B_{n1}s} \cdot \frac{s^2 + \alpha_{b1}s + \alpha_{k1}}{s^2 + \beta_{b1}s + \beta_{k1}} \tag{13}$$

-continued $$J_{n1} = J_{m1}, B_{n1} = \frac{B_{m1}}{G_1}, \alpha_{b1} = \frac{B_{Tyre1}}{G_1^2 J_{Tyre1}}$$

$$\alpha_{k1} = \frac{K_{Bush1}}{G_1^2 J_{Tyre1}}, \beta_{b1} = \frac{B_{Tyre1}}{J_{Tyre1}}, \beta_{k1} = \frac{K_{Bush1}}{J_{Tyre1}}$$

Mathematical formula 14

$$P_{na}^{-1}(s) = \left(J_{n1}s^2 + B_{n1}s\right)\frac{s^2 + \beta_{b1}s + \beta_{k1}}{s^2 + \alpha_{b1}s + \alpha_{k1}} \qquad (14)$$

Here, s is a Laplace variable, Jm1 is a parameter corresponding to the moment of inertia of the first turning side motor 33, Bm1 is a parameter corresponding to a viscous friction coefficient of the first turning side motor 33, JTyre1 is a parameter corresponding to the moment of inertia of the first turning wheel 21, BTyre1 is a parameter corresponding to a viscous friction coefficient of the first turning wheel 21, KBush1 is a parameter corresponding to an equivalent spring constant of an elastic element including the bushings 23d, 23e, 41a, and 42a in the first control target 65a, and G1 is a parameter corresponding to a gear ratio from the first turning side motor 33 to the first turning wheel 21. Note that BTyre1 also includes a viscous element of each of the bushings 23d, 23e, 41a, and 42a.

As shown in Formula (13) above, the transfer function Pna(s) of the first nominal model NM1 includes at least a function Fan(s). In the present example embodiment, the transfer function Pna(s) includes only the function Fan(s).

The first nominal model NM1 is derived based on the simplified first control target 65a illustrated in FIG. 14. In order to obtain a self-aligning torque SAT1 that is force generated by the first turning wheel 21 from a model illustrated in FIG. 14, it is necessary to obtain a transfer characteristic from output torque of the first turning side motor 33 not including the self-aligning torque SAT1 to the first output angle θg1 of the first turning side motor 33 based on a simplified turning system characteristic. This not only improves estimation accuracy of the self-aligning torque SAT1, also design but enables that compensates a steering characteristic brought about by compliance of a vehicle. Based on the simplified model illustrated in FIG. 14, a transfer characteristic from an output torque Tg1 of the first turning side motor 33 to the first output angle θg1 of the first turning side motor 33 is obtained as Formula (15) below.

Mathematical formula 15

$$\frac{\theta_{g1}}{T_{g1}} = \frac{G_1^2\left(J_{Tyre1}s^2 + B_{Tyre1}s + K_{Bush1}\right)}{G_1^2 J_{Tyre1}J_{m1}s^3 + D_1s^2 + D_2s + D_3} \cdot \frac{1}{s} \qquad (15)$$

$$D_1 = G_1^2 J_{m1}B_{Tyre1} + G_1 J_{Tyre1}B_{m1}$$

$$D_2 = K_{Bush1}J_{Tyre1} + G_1^2 K_{Tyre1}J_{m1} + G_1 B_{Tyre1}B_{m1}$$

$$D_3 = K_{Bush1}B_{Tyre1} + G_1 K_{Bush1}B_{m1}$$

Here, since a gear ratio from the first turning side motor 33 to the first turning wheel 21 is about 300, KBush1/G2 can be regarded as substantially zero. By using this fact to rearrange the right term of Formula (15) above, the transfer function Pna(s) of the first nominal model NM1 can be derived.

The first term of the transfer function Pna(s) of the first nominal model NM1, that is, 1/(Jn1s2+Bn1s) is a term relating to a mechanical characteristic of the first turning side motor 33. The first term of the transfer function Pna(s) affects responsiveness of the first turning side motor 33. In a case where active front steer control is performed, for example, since a time constant is 0.05 seconds, 1/10 of that is required as responsiveness of the control. In order to achieve this responsiveness, it is desirable to compensate inertia of the first turning side motor 33, friction of the first turning side motor 33, and the like, and set a state in which mechanical responsiveness of the first turning side motor 33 is high. This can be achieved by providing the state feedback unit 62. Further, Jn1 and Bn1 in the first term of the transfer function Pna(s) are parameters for setting a motor characteristic of the first turning side motor 33 visible from the first model following controller 63 after compensation is performed by provision of the state feedback unit 62. By adjusting Jn1 and Bn1, robust stability of the first model following controller 63 can be improved. By these, both responsiveness and robust stability can be achieved.

Further, the second term of the transfer function Pna(s) of the first nominal model NM1, that is, (s2+αb1s+αk1)/(s2+βb1s+βk1) is a term related to compensation of the compliance steer. The compliance steer is a change in an actual steering angle caused by generation of an angle on a tire of a vehicle, like one generated when a steering wheel is turned, due to deflection generated on a suspension element of the vehicle such as a rubber bushing when an external force acts on a grounding portion of the tire. The compliance steer in the present example embodiment is a change in an angle of the first turning wheel 21 and an angle of the second turning wheel 22 due to generation of deflection in a suspension element such as the bushings 23d, 23e, 41a, and 42a. Physical parameters that affect the compliance steer are an elastic element such as a bushing and a viscous element of a tire, and are KBush1 and BTire1 in the transfer function Pna(s). In the second term of the transfer function Pna(s), by setting KBush1 and BTire1 as ideal parameters and determining αb1, αk1, βb1, and βk1, the first nominal model NM1 can be made a model having a desirable compliance characteristic. By performing model following control using the first nominal model NM1 obtained in this manner, a compliance steer characteristic of a vehicle can be suitably compensated. By the above, for example, traveling stability of a vehicle can be ensured regardless of where the first battery 85a and the second battery 85b are arranged in the vehicle.

Note that KBush1 affects only the second term in the transfer function Pna(s), and a natural frequency of KBush1 is sufficiently higher than a frequency band of the self-aligning torque SAT1 generated in the first turning wheel 21. For this reason, KBush1 has little influence on estimation of the self-aligning torque SAT1. The natural frequency of KBush1 is, for example, about 20 Hz or more and 30 Hz or less. The frequency band of the self-aligning torque SAT1 is, for example, about 10 Hz or less.

As illustrated in FIG. 13, output of the first control target 65a is input to the first inverse nominal model 63a. Specifically, the first output angle θg1 of the first turning side motor 33 is input to the first inverse nominal model 63a. The first inverse nominal model 63a outputs a torque Tp1 based on Formula (14) above and the input first output angle θg1. That is, the first model following controller 63 calculates the torque Tp1 by using the first nominal model NM1 based on output of the first control target 65a. The torque Tp1 is equal to a value of a torque input to the first nominal model NM1 in a case where an output value of the first nominal model NM1 is the same value as an output value of the first control target 65a.

The subtractor SU3 subtracts output of the subtractor SU2 from output of the first inverse nominal model 63a to generate a differential torque Ta1. That is, the subtractor SU3 subtracts, from the torque Tp1, the first input torque Tr1 before a state compensation value Vs1 described later is fed back after the correction torque Tf1 is fed back, to generate the differential torque Ta1. The differential torque Ta1 is, for example, an estimation value of the disturbance torque Td1, and includes the self-aligning torque SAT1 of the first turning wheel 21 and a second interference torque caused by the second turning side motor 34 driving the turning assembly 20. The second interference torque is applied to the first control target 65a.

The differential torque Ta1 output from the subtractor SU3 is subjected to filter processing by the filter 63b and input to the subtractor SU4. The differential torque Ta1 subjected to the filter processing by the filter 63b is referred to as a differential torque Ta1f. The filter 63b is, for example, a filter configured by combining a low-pass filter and a high-pass filter in series. By the above, the differential torque Ta1f after applied with filter processing in the filter 63b is a frequency component equal to or more than a first cutoff frequency Cf1 of a high-pass filter in the filter 63b and equal to or less than a second cutoff frequency Cf2 of a low-pass filter in the filter 63b. The differential torque Ta1f applied with filter processing by the filter 63b includes frictional force, the self-aligning torque SAT1 of the first turning wheel 21, a disturbance torque caused by backlash of the first control target 65a, torque ripple generated in the first control target 65a, and the like.

The subtractor SU4 subtracts the correction interference torque Tm2R output from the cooperative controller 56a from an output value from the filter 63b, that is, the differential torque Ta1f to obtain a correction torque Tf1, and outputs the correction torque Tf1 to the subtractor SU2. The correction torque Tf1 output from the subtractor SU4 is fed back to input of the first control target 65a, that is, the first input torque Tr1.

Here, as described above, a value of the correction interference torque Tm2R changes according to the steering frequency f of the correction interference torque Tm1 output from the compensation torque calculation unit 56c. For this reason, a value of the correction interference torque Tm2R subtracted from the differential torque Ta1f in the subtractor SU4 changes according to the steering frequency f. Specifically, since a gain in a transfer function of the frequency domain setter 56d is 1 in a domain where the steering frequency f is equal to or less than the cutoff frequency $\omega 1$, a value of the correction interference torque Tm2R is the same as a value of the correction interference torque Tm1. By the above, a value subtracted from the differential torque Ta1f by the subtractor SU4 is equal to a value of the correction interference torque Tm1. In this case, the first model following controller 63 performs control by including the correction interference torque Tm2R in the correction torque Tf1. In the present example embodiment, model following control performed by including the correction interference torque Tm2R in the correction torque Tf1 in this manner is referred to as "cooperative control CT1". The cooperative control CT1 corresponds to "first control".

On the other hand, in a domain where the steering frequency f is higher than the cutoff frequency $\omega 1$, a gain in a transfer function of the frequency domain setter 56d is smaller than one, so that a value of the correction interference torque Tm2R is smaller than a value of the correction interference torque Tm1. For this reason, a value of the correction interference torque Tm2R subtracted from the differential torque Ta1f is smaller than that in a case where the steering frequency f is equal to or less than the cutoff frequency $\omega 1$. When the steering frequency f is high at a certain degree or more in a domain higher than the cutoff frequency $\omega 1$, the correction interference torque Tm2R is sufficiently attenuated in the frequency domain setter 56d. In this case, a value subtracted from the differential torque Ta1f in the subtractor SU4 can be regarded as substantially zero. As described above, in a domain where the steering frequency f is higher than the cutoff frequency $\omega 1$, a value of the correction interference torque Tm2R subtracted from the differential torque Ta1f is smaller than that in the cooperative control CT1 described above. In other words, in a domain where the steering frequency f is higher than the cutoff frequency $\omega 1$, influence of the correction interference torque Tm2R on the correction torque Tf1 is smaller than that in the cooperative control CT1. In the present example embodiment, model following control in which influence of the correction interference torque Tm2R on the correction torque Tf1 is smaller than that in the cooperative control CT1 is referred to as "non-interference control CT2". The non-interference control CT2 corresponds to "second control". Note that, in the present description, "influence of a correction interference torque on a correction torque is smaller than that of cooperative control" includes a case where a correction interference torque is not input to each model following controller.

As described above, in the present example embodiment, the first model following controller 63 can execute the cooperative control CT1 and the non-interference control CT2. In the present example embodiment, as illustrated in FIG. 10, the cooperative control CT1 is executed in a case where the steering frequency f is in a cooperative control domain PH1 equal to or less than the cutoff frequency $\omega 1$, and the non-interference control CT2 is executed in a case where the steering frequency f is in a non-interference control domain PH2 higher than the cutoff frequency $\omega 1$. That is, the cooperative control CT1 and the non-interference control CT2 are switched based on the steering frequency f, which is a frequency of the steering angle $\theta h$ that changes when the steering wheel 11 is steered. The steering frequency f when the non-interference control CT2 is executed is higher than the steering frequency f when the cooperative control CT1 is executed. In the present example embodiment, the cooperative control CT1 and the non-interference control CT2 are automatically switched according to the steering frequency f by low-pass filter processing performed in the frequency domain setter 56d.

As illustrated in FIG. 13, the differential torque Ta1f output from the filter 63b is input to the noise removal filter 63c. The noise removal filter 63c removes at least a portion of noise from the differential torque Ta1f. A torque output from the noise removal filter 63c is the first self-aligning torque estimation value SATh1. The first self-aligning torque estimation value SATh1 is an estimation value of the self-aligning torque SAT1 generated in the first turning wheel 21. As illustrated in FIG. 5, the first self-aligning torque estimation value SATh1 output from the noise removal filter 63c is input to the command value generators 55a and 55b, the cooperative controllers 56a and 56b, and the steering reaction force controllers 57a and 57b in the first steering side controller 51 and the second steering side controller 52.

As illustrated in FIG. 13, the state feedback unit 62 feeds back the state compensation value Vs1 to the first input torque Tr1 so that an apparent transfer function of the first control target 65a approaches the transfer function Pna(s) of the first nominal model NM1 based on output of the first control target 65a, that is, the first output angle θg1. The apparent transfer function of the first control target 65a is, for example, a transfer function of one portion in a case where a portion located inside a feedback loop formed by the first model following controller 63 is regarded as the one portion. Specifically, in the present example embodiment, an apparent transfer function of the first control target 65a is a transfer function of an entire portion from the subtractor SU2 to output of the first control target 65a, and is a transfer function of a portion combining the state feedback unit 62 and the first control target 65a. In the present example embodiment, the state feedback unit 62 feeds back the state compensation value Vs1 to the first input torque Tr1 after being corrected by the correction torque Tf1 and before being input to the first control target 65a.

The state compensation value Vs1 includes a compensation value for compensating at least a portion of inertial force generated in the first control target 65a, viscous force generated in the first control target 65a, and frictional force generated in the first control target 65a. More specifically, the state compensation value Vs1 includes a compensation value for compensating at least a portion of inertial force generated in the first turning side motor 33, viscous force generated in the first turning side motor 33, and frictional force generated in the first turning side motor 33. In the present example embodiment, the state compensation value Vs1 is a compensation value including inertial force generated in the first turning side motor 33, viscous force generated in the first turning side motor 33, and frictional force generated in the first turning side motor 33.

The state feedback unit 62 includes inertia compensator 62a, a viscosity compensator 62b, and a friction compensator 62c. The inertia compensator 62a calculates a compensation value for compensating at least a portion of inertial force generated in the first turning side motor 33 based on the first output angle θg1 of the first turning side motor 33. The viscosity compensator 62b calculates a compensation value for compensating at least a portion of viscous force generated in the first turning side motor 33 based on the first output angle θg1 of the first turning side motor 33. The friction compensator 62c calculates a compensation value for compensating at least a portion of frictional force generated in the first turning side motor 33 based on the first output angle θg1 of the first turning side motor 33. In the present example embodiment, the state compensation value Vs1 includes a compensation value calculated by the inertia compensator 62a, a compensation value calculated by the viscosity compensator 62b, and a compensation value calculated by the friction compensator 62c. A compensation value calculated by the inertia compensator 62a, a compensation value calculated by the viscosity compensator 62b, and a compensation value calculated by the friction compensator 62c are output to the adder AD1 and added to the first input torque Tr1 after corrected by the correction torque Tf1.

Next, control by the first model following controller 63 will be described in more detail. The first model following controller 63 controls the first control target 65a by using an inverse model of the first nominal model NM1 included as an internal model, that is, the first inverse nominal model 63a.

The first model following controller 63 is structurally similar to a conventional disturbance estimator (disturbance observer), but has different actions and effects. A conventional disturbance estimator estimates a disturbance torque by using an inverse plant model as an internal model as a model close to the first control target 65a, and reduces influence of disturbance by adjusting a disturbance torque in advance.

Control by the first model following controller 63 according to the present example embodiment utilizes the effect that the transfer function PSAW1(s) of the first control target 65a is restricted to the transfer function Pna(s) of the first nominal model NM1 included as an internal model by a feedback loop. For example, if the first nominal model NM1 is defined such that there is no torque ripple, the transfer function PSAW1(s) of the first control target 65a is restricted to a characteristic without a torque ripple by model following control. As a result, a torque ripple can be reduced by applying torque ripple compensation. Further, the first control target 65a can be treated as a low inertia model by setting the first nominal model NM1 as a low inertia model and restricting the first control target 65a with the first nominal model NM1. Further, the first control target 65a can be treated as a low viscosity model by setting the first nominal model NM1 as a low viscosity model and restricting the first control target 65a with the first nominal model NM1. By the first model following controller 63 executing model following control, for example, lost torque compensation or motor inertia compensation is performed in addition to compensation of a torque ripple of the first turning side motor 33. By appropriately setting Jn1 and Bn1 in Formulas (13) and (14) described above, a desired frequency characteristic can be given to the transfer function PSAW1 (s) of the first control target 65a.

When a modeling error between the transfer function PSAW1(s) of the first control target 65a and the transfer function Pna(s) of the first nominal model NM1 is Δ(s), the transfer function PSAW1(s) of the first control target 65a is expressed by Formula (16) below.

Mathematical formula 16

$$P_{SAW1}(s) = \frac{1}{J_{n1}s^2 + B_{n1}s} \frac{s^2 + \alpha_{b1}s + \alpha_{k1}}{s^2 + \beta_{b1}s + \beta_{k1}}(1 + \Delta(s)) \tag{16}$$

Figure 15:
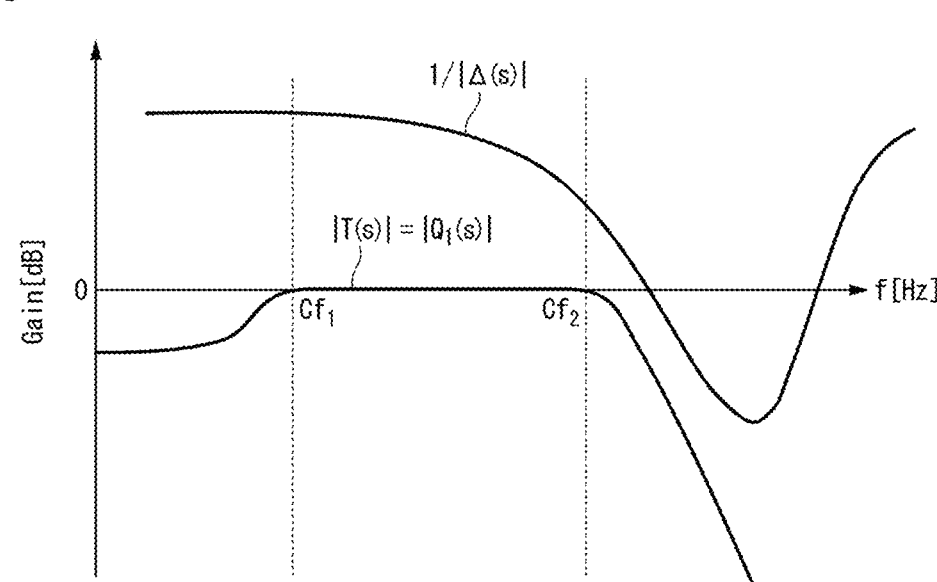
FIG. 15 is a graph exemplifying a gain characteristic of a complementary sensitivity function and a gain characteristic of a reciprocal of a modeling error between a transfer function of the first control target and a transfer function of a first nominal model.

A gain characteristic of the transfer function PSAW1(s) of the first control target 65a has, for example, a peak in two frequency values. The modeling error Δ(s) appears, for example, near a higher frequency peak of two peaks in a gain characteristic of the first control target 65a. For this reason, as illustrated in FIG. 15, the reciprocal 1/Δ(s) of the modeling error Δ(s) has a bottom in a relatively high frequency domain. In FIG. 15, the modeling error Δ(s) is indicated by an absolute value. When the modeling error Δ(s) is large, a deviation between the transfer function PSAW1(s) of the first control target 65a and the transfer function Pna(s) of the first nominal model NM1 becomes large, and control of the first control target 65a using the first nominal model NM1 by the first model following controller 63 becomes unstable. For this reason, in a domain where the modeling error Δ(s) is relatively small, the first control target 65a can be stably and suitably controlled by setting a gain of the complementary sensitivity function T1(s), that is, Q1(s), to be approximately one and restricting the first control target 65a to the first nominal model NM1. A frequency characteristic of the modeling error Δ(s) can be adjusted by adjusting Jn1 and Bn1 in the transfer function Pna(s) of the first nominal model NM1. A frequency band in which a gain of Q1(s) is approximately one can be adjusted by adjusting the first cutoff frequency Cf1 and the second cutoff frequency Cf2.

By the above, a gain of Q1(s) can be adjusted to be approximately one in a frequency band in which the modeling error Δ(s) is small. In the present example embodiment, a gain of the complementary sensitivity function T1(s), that is, Q1(s), is set within a range of 0.8 or more and less than 1.

In FIG. 15, 1/Δ(s) is relatively high in a frequency band of the second cutoff frequency Cf2 or less, and rapidly decreases in a frequency band higher than the second cutoff frequency Cf2. Model following control for restricting the first control target 65a to the first nominal model NM1 can be stably performed, for example, in a range where 1/Δ(s) is larger than one, that is, in a range larger than 0 dB. For this reason, as illustrated in FIG. 15, by adjusting 1/Δ(s) to be larger than one in a frequency band in which a gain of Q1(s) is approximately one, in a case where a gain of Q1(s) is approximately one, the first control target 65a can be restrained to the first nominal model NM1 to be stably and suitably controlled.

For example, in order to expand a frequency band in which the first control target 65a can be restricted to the first nominal model NM1 to be stably and suitably controlled, the second cutoff frequency Cf2 is preferably made high within a range in which 1/Δ(s) is not one or less, that is, within a frequency band lower than a frequency at which a curve indicating 1/Δ(s) intersects the horizontal axis in FIG. 15. However, if the second cutoff frequency Cf2 is made too high, a gain of Q1(s) remains relatively high even though 1/Δ(s) becomes low in a frequency band higher than the second cutoff frequency Cf2, and control may become unstable. On the other hand, for example, by setting the order of a low-pass filter in the filter 63b to three or more, a gain of Q1(s) can be steeply decreased in a domain where a frequency is higher than the second cutoff frequency Cf2. By the above, even if the second cutoff frequency Cf2 is made relatively high, a gain of Q1(s) can be immediately lowered in a frequency band higher than the second cutoff frequency Cf2, so that control of the first control target 65a can be prevented from becoming unstable.

Robust stability of the first model following controller 63 is guaranteed when the small-gain theorem shown in Formula (17) below is established between the complementary sensitivity function T1(s) and the modeling error Δ(s).

Mathematical formula 17

$$|T_1(j\omega)| < \frac{1}{|\Delta(j\omega)|}, \text{ or, } |T_1(j\omega)\Delta(j\omega)| < 1, \forall s = j\omega \qquad (17)$$

In order to satisfy Formula (17) above, it is necessary to set the first nominal model NM1 so that the modeling error Δ(s) is as small as possible within a frequency band in which model following control is performed. For example, in a case where responsiveness to be achieved is 0.05 seconds in terms of a time constant, it is necessary to set the first nominal model NM1 such that the modeling error Δ(s) decreases to 40 Hz corresponding to a frequency ten times the time constant. In the present example embodiment, for example, as illustrated in FIG. 14, by capturing the first control target 65a with a simplified model and setting the first nominal model NM1, it is possible to set the first nominal model NM1 such that the modeling error Δ(s) decreases to 40 Hz.

The transfer function Q1(s) of the filter 63b is designed to satisfy Formula (17) above in consideration of a transfer characteristic from the output torque Tg1 of the first turning side motor 33 to the first output angle θg1 of the first turning side motor 33 in the simplified model illustrated in FIG. 14, that is, a modeling error not included in Formula (15) above. In the present example embodiment, by providing the state feedback unit 62, influence of fluctuation in various parameters of the first control target 65a on Formula (17) can be compensated. Note that, in the present example embodiment, an example in which the state feedback unit 62 is implemented by a transfer function is described, but the state feedback unit 62 may be implemented by extended state spatial representation in which disturbance is a portion of a state variable.

Figure 16:
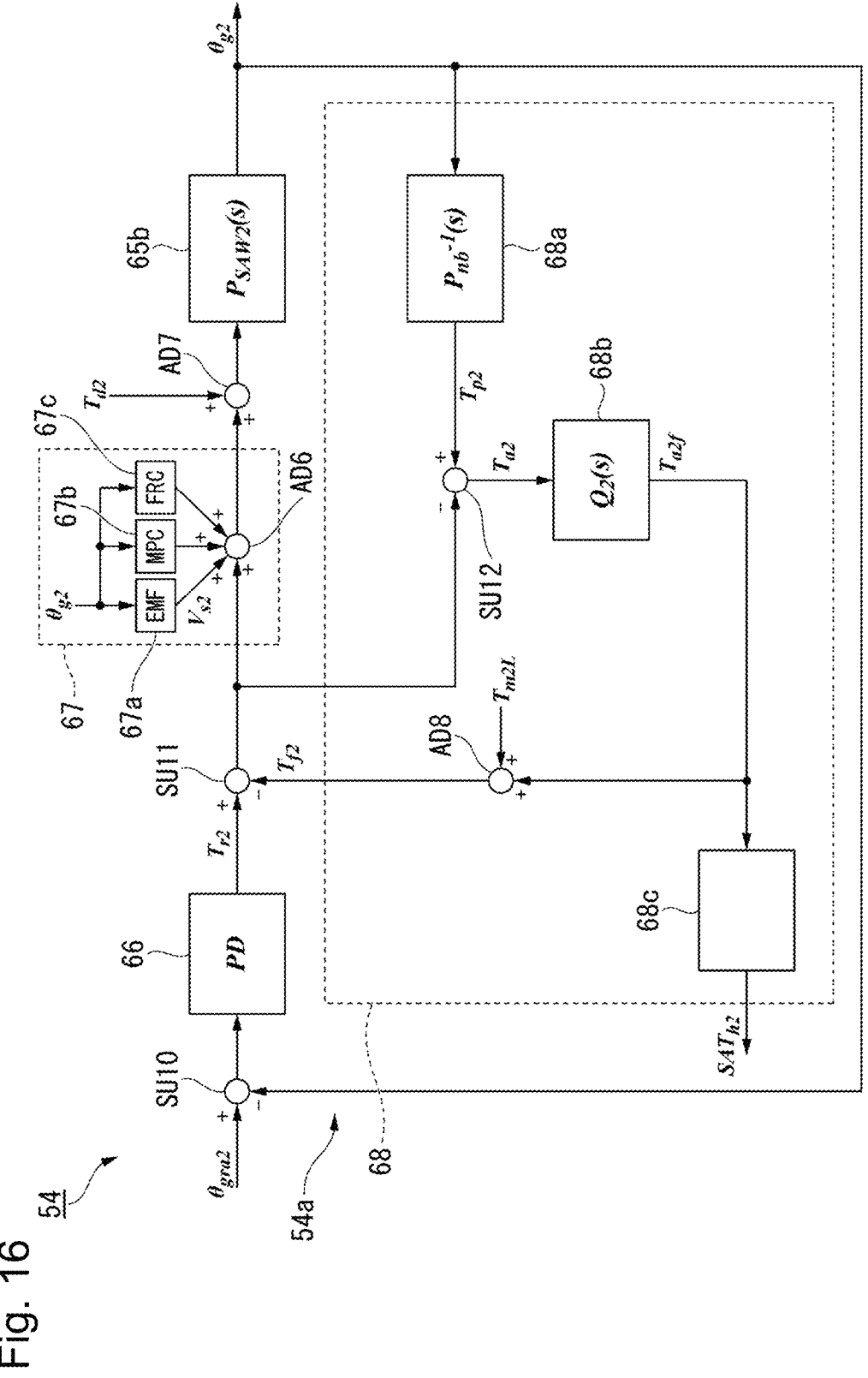
FIG. 16 is a block diagram illustrating a configuration of a portion of the second turning side controller in the first example embodiment.

As illustrated in FIG. 5, the turning side motor angle command value θgra2 and the correction interference torque Tm2L are input to the second processor 54a. As illustrated in FIG. 16, the second processor 54a includes an angle controller 66, a state feedback unit 67, the second model following controller 68, subtractors SU10 and SU11, and adders AD6 and AD7. That is, the second turning side controller 54 includes the angle controller 66, the state feedback unit 67, the second model following controller 68, the subtractors SU10 and SU11, and the adders AD6 and AD7. The turning side motor angle command value θgra2 input to the second processor 54a is input to the subtractor SU10. The subtractor SU10 subtracts the second output angle θg2 of the second turning side motor 34 from the turning side motor angle command value θgra2, and outputs a result to the angle controller 66. By performing PD control, the angle controller 66 calculates a second input torque Tr2 from an angle value input from the subtractor SU10, and outputs the second input torque Tr2 to the subtractor SU11.

The subtractor SU11 subtracts a correction torque Tf2 output from the second model following controller 68 from the second input torque Tr2. Output from the subtractor SU11 is input to the adder AD6 and the second model following controller 68. The adder AD6 outputs a value obtained by adding output from the state feedback unit 67 to output from the subtractor SU11 to the adder AD7. The adder AD7 outputs a value obtained by adding a disturbance torque Td2 to output from the adder AD6 to the second control target 65b. In the present example embodiment, the second control target 65b includes the second turning side motor 34, the second turning wheel 22, and each bushing provided around the second turning wheel 22 and the second turning side motor 34 similarly to the bushings 23d, 23e, 41a, and 42a illustrated in FIG. 2. In the present example embodiment, the second control target 65b includes a portion from the second turning side motor 34 to the second turning wheel 22 of a vehicle. Output of the second control target 65b is the second output angle θg2 of the second turning side motor 34. Similarly to the first control target 65a, the second control target 65b can be shown by a simplified model as illustrated in FIG. 14. A transfer function PSAW2(s) of the second control target 65b can be expressed similarly to the first control target 65a.

The second model following controller 68 performs model following control on the second control target 65b similarly to the first following controller 63. The second model following controller 68 generates the correction torque Tf2 for correcting the second input torque Tr2 input to the second control target 65b based on output of the second control target 65b and a second nominal model NM2 based on a configuration of the second control target 65b. In the present example embodiment, the correction torque Tf2 is a feedback torque fed back to the second input torque Tr2. The second nominal model NM2 is an internal model used as a model that restricts the second control target 65b when the second control target 65*b* is controlled. The second model following controller 68 generates the correction torque Tf2 based on the second output angle θg2 of the second turning side motor 34, and feeds back the correction torque Tf2 to the second input torque Tr2. The second model following controller 68 includes a second inverse nominal model 68*a*, a filter 68*b*, a noise removal filter 68*c*, a subtractor SU12, and an adder AD8. The filter 68*b* is similar to the filter 63*b*. The noise removal filter 68*c* is similar to the noise removal filter 63*c*.

The second inverse nominal model 68*a* is an inverse model of the second nominal model NM2 used to restrict the second control target 65*b*. In the present example embodiment, a transfer function Pnb(s) of the second nominal model NM2 is expressed by Formula (18) below. A transfer function Pnb-1(*s*) of the second inverse nominal model 68*a* is expressed by Formula (19) below.

Mathematical formula 18

$$P_{nb}(s) = F_{nb}(s) = \frac{1}{J_{n2}s^2 + B_{n2}s} \frac{s^2 + \alpha_{b2}s + \alpha_{k2}}{s^2 + \beta_{b2}s + \beta_{k2}} \tag{18}$$

$$J_{n2} = J_{m2}, B_{n2} = \frac{B_{m2}}{G_2}, \alpha_{b2} = \frac{B_{Tyre2}}{G_2^2 J_{Tyre2}}$$

$$\alpha_{k2} = \frac{K_{Bush2}}{G_2^2 J_{Tyre2}}, \beta_{b2} = \frac{B_{Tyre2}}{J_{Tyre2}}, \beta_{k2} = \frac{K_{Bush2}}{J_{Tyre2}}$$

Mathematical formula 19

$$P_{nb}^{-1}(s) = \left(J_{n2}s^2 + B_{n2}s\right) \frac{s^2 + \beta_{b2}s + \beta_{k2}}{s^2 + \alpha_{b2}s + \alpha_{k2}} \tag{19}$$

Here, s is a Laplace variable, Jm2 is a parameter corresponding to the moment of inertia of the second turning side motor 34, Bm2 is a parameter corresponding to a viscous friction coefficient of the second turning side motor 34, JTyre2 is a parameter corresponding to the moment of inertia of the second turning wheel 22, BTyre2 is a parameter corresponding to a viscous friction coefficient of the second turning wheel 22, KBush2 is a parameter corresponding to an equivalent spring constant of an elastic element including a bushing in the second control target 65*b*, and G2 is a parameter corresponding to a gear ratio from the second turning side motor 34 to the second turning wheel 22.

As shown by Formula (18) above, the transfer function Pnb(s) of the second nominal model NM2 includes at least a function Fib(s). In the present example embodiment, the transfer function Pnb(s) includes only the function Fib(s).

As illustrated in FIG. 16, output of the second control target 65*b* is input to the second inverse nominal model 68*a*. Specifically, the second output angle θg2 of the second turning side motor 34 is input to the second inverse nominal model 68*a*. The second inverse nominal model 68*a* outputs a torque Tp2 based on Formula (19) above and the input second output angle θg2. That is, the second model following controller 68 calculates the torque Tp2 by using the second nominal model NM2 based on output of the second control target 65*b*. The torque Tp2 is equal to a value of a torque input to the second nominal model NM2 in a case where an output value of the second nominal model NM2 is the same value as an output value of the second control target 65*b*.

The subtractor SU12 subtracts output of the subtractor SU11 from output of the second inverse nominal model 68*a* to generate a differential torque Ta2. That is, the subtractor SU12 subtracts, from the torque Tp2, the second input torque Tr2 before a state compensation value Vs2 to be described later is fed back after the correction torque Tf2 is fed back, to generate the differential torque Ta2. The differential torque Ta2 is, for example, an estimation value of the disturbance torque Td2, and includes a self-aligning torque of the second turning wheel 22 and a first interference torque caused by the first turning side motor 33 driving the turning assembly 20. The first interference torque is applied to the second control target 65*b*.

The differential torque Ta2 output from the subtractor SU12 is subjected to filter processing by the filter 68*b* and input to the adder AD8. The differential torque Ta2 applied with filter processing by the filter 68*b* is referred to as a differential torque Ta2*f*. The differential torque Ta2*f* includes frictional force, a self-aligning torque of the second turning wheel 22, a disturbance torque caused by backlash of the second control target 65*b*, torque ripple generated in the second control target 65*b*, and the like.

The adder AD8 adds the correction interference torque Tm2L output from the cooperative controller 56*b* to an output value from the filter 68*b*, that is, the differential torque Ta2*f* to obtain a correction torque Tf2, and outputs the correction torque Tf2 to the subtractor SU11. The correction torque Tf2 output from the adder AD8 is fed back to input of the second control target 65*b*, that is, the second input torque Tr2.

Here, a value of the correction interference torque Tm2L changes according to the steering frequency f, similarly to the correction interference torque Tm2R input to the first model following controller 63. By the above, in the present example embodiment, the second model following controller 68 can execute the cooperative control CT1 and the non-interference control CT2 similarly to the first model following controller 63.

The differential torque Ta2*f* output from the filter 68*b* is input to the noise removal filter 68*c*. The noise removal filter 68*c* removes at least a portion of noise from the differential torque Ta2*f*. A torque output from the noise removal filter 68*c* is the second self-aligning torque estimation value SATh2. The second self-aligning torque estimation value SATh2 is an estimation value of a self-aligning torque generated in the second turning wheel 22. As illustrated in FIG. 5, the second self-aligning torque estimation value SATh2 output from the noise removal filter 68*c* is input to the command value generators 55*a* and 55*b*, the cooperative controllers 56*a* and 56*b*, and the steering reaction force controllers 57*a* and 57*b* in the first steering side controller 51 and the second steering side controller 52.

As illustrated in FIG. 16, the state feedback unit 67 feeds back the state compensation value Vs2 to the second input torque Tr2 so that an apparent transfer function of the second control target 65*b* approaches the transfer function Pnb(s) of the second nominal model NM2 based on output of the second control target 65*b*, that is, the second output angle θg2. The apparent transfer function of the second control target 65*b* is, for example, a transfer function of one portion in a case where a portion located inside a feedback loop formed by the second model following controller 68 is regarded as the one portion. Specifically, in the present example embodiment, the apparent transfer function of the second control target 65*b* is a transfer function of an entire portion from the subtractor SU11 to output of the second control target 65*b*, and is a transfer function of a portion combining the state feedback unit 67 and the second control target 65*b*. In the present example embodiment, the state feedback unit 67 feeds back the state compensation value Vs2 to the second input torque Tr2 after being corrected by the correction torque Tf2 and before being input to the second control target 65*b*.

In the present example embodiment, similarly to the state feedback unit 62, the state feedback unit 67 includes an inertia compensator 67*a*, a viscosity compensator 67*b*, and a friction compensator 67*c*. In the present example embodiment, the state compensation value Vs2 is a compensation value including inertial force generated in the second turning side motor 34, viscous force generated in the second turning side motor 34, and frictional force generated in the second turning side motor 34. Each compensation value is output to the adder AD6 and added to the second input torque Tr2 corrected by the correction torque Tf2.

In the present example embodiment, ASIL Decomposition below is used to satisfy the highest "D", that is, ASIL D, standard in automotive safety integrity level (ASIL) defined in the international functional safety standard "ISO 26262". In a drive system that drives the turning assembly 20, two turning side motors, the first turning side motor 33 and the second turning side motor 34, are motors each including two systems of the coil groups 37, and the first turning side controller 53 and the second turning side controller 54 are provided with a plurality of the inverter circuits 58 and 59 each independently supplying power to each of the coil groups 37 in each turning side motor controlled by each of the turning side controllers. By the above, each of a motor to drive the turning assembly 20 and an inverter circuit that drives the motor satisfies the standard of ASIL C. Therefore, by combining these, ASIL D=ASIL C (D)+ASIL C (D), and the drive system that drives the turning assembly 20 satisfies the standard of ASIL D.

In a case where the turning assembly 20 is driven by the first turning side motor 33 and the second turning side motor 34 that are independently driven as described above, when drive by the first turning side motor 33 and drive by the second turning side motor 34 are misaligned, a first interference torque caused by the first turning side motor 33 driving the turning assembly 20 is applied to the second control target 65*b* that is a control target of the second turning side motor 34, and a second interference torque caused by the second turning side motor 34 driving the turning assembly 20 is applied to a first control target of the first turning side motor 33. That is, an output torque of the first turning side motor 33 and an output torque of the second turning side motor 34 interfere with each other. Therefore, it is necessary to solve an interference problem between two turning side motors while maintaining independence of each of the turning side motors and each of the inverter circuits 58 and 59.

In general, as a method of solving an interference problem between two motor outputs as described above, a method of synchronizing response of speeds of two motors is known. As a means for realizing the method, generally, there is a means for exchanging speed information between two motors and performing control to correct a speed of each of the motors. However, in order to satisfy the safety standard of ASIL D described above, it is necessary to electrically maintain independence of each motor and each inverter circuit. Therefore, for example, it is necessary to exchange speed information between motors through communication means such as CAN. However, in this case, variation and delay in a communication timing occurs, and it is difficult to synchronize speeds of the motors. Further, for example, a method of synchronizing speeds of two motors by providing a third controller separately from two controllers that control the two motors is conceivable. However, in this case, since it is necessary to provide the third controller, there is a problem that the number of components of a control device in a steering device increases or the control device becomes complicated.

In view of the above problem, in the present example embodiment, model following control is employed for torque control of two turning side motors and a method of synchronizing speeds of the two turning side motors is employed. If two turning side motors are put into the same nominal model, by making torque commands the same, it is possible to compensate asynchronization of speeds of the turning side motors even in a case where loads applied to the turning side motors are different.

Specifically, in the present example embodiment, the first model following controller 63 is configured such that a transfer function of the first control target 65*a* is restricted to a transfer function of the first nominal model NM1 in a frequency band in which a gain in a gain characteristic of the complementary sensitivity function T1($s$), that is, the transfer function Q1($s$) of the filter 63*b*, with respect to the modeling error Δ(s) between the first control target 65*a* including the first turning side motor 33 and the first nominal model NM1 is approximately one. The second model following controller 68 is configured such that a transfer function of the second control target 65*b* is restricted to a transfer function of the second nominal model NM2 in a frequency band in which a gain in a gain characteristic of a complementary sensitivity function T2($s$), that is, a transfer function Q2($s$) of the filter 68*b*, with respect to the modeling error Δ(s) between the second control target 65*b* including the second turning side motor 34 and the second nominal model NM2 is approximately one. As described above, by restricting each control target including each turning side motor to a nominal model by model following control, it is possible to compensate an interference torque caused by another turning side motor in control of each turning side motor. That is, the first turning side controller 53 compensates a second interference torque caused by the second turning side motor 34 driving the turning assembly 20 by model following control of restricting a transfer function of the first control target 65*a* to a transfer function of the first nominal model NM1 based on a configuration of the first control target 65*a*. The second turning side controller 54 compensates a first interference torque caused by the first turning side motor 33 driving the turning assembly 20 by model following control of restricting a transfer function of the second control target 65*b* to a transfer function of the second nominal model NM2 based on a configuration of the second control target 65*b*. For this reason, as compared with a case in which a communication means such as CAN is used, a rotation speed of the first turning side motor 33 and a rotation speed of the second turning side motor 34 can be suitably synchronized easily, and the turning assembly 20 can be suitably controlled. By the above, it is possible to solve an interference problem between two turning side motors while maintaining electrical independence of each of the turning side motors and each turning side controller. Therefore, it is possible to improve controllability of the steering device 100 and improve steering performance of the steering device 100 while ensuring safety of the steering device 100. Further, since it is not necessary to provide the third controller as described above, it is possible to prevent increase in the number of components of the control device 50 in the steering device 100 and complication of the control device 50.

Further, by performing model following control in the first model following controller 63 and the second model following controller 68, torque ripple, friction, and the like of the first turning side motor 33 and the second turning side motor 34 can be compensated. For this reason, it is possible to control movement of a vehicle in a lateral direction with small force in advanced driver-assistance systems (ADAS), automatic driving of a vehicle, and the like.

There is a case where it is difficult to compensate asynchronization of speeds of turning side motors due to variation in a torque constant of each of the turning side motors and a detection value of a current sensor (not illustrated) capable of detecting current supplied to each of the turning side motors. On the other hand, in the present example embodiment, gains of the complementary sensitivity functions T1($s$) and T2($s$), that is, Q1($s$) and Q2($s$), are set within a range of 0.8 or more and less than 1. By setting gains of Q1($s$) and Q2($s$) to be slightly smaller than one, strength of model following control performed in each model following controller can be appropriately weakened. For example, if a disturbance reduction characteristic is enhanced with a gain strictly set to one in one model following controller, disturbance can be suitably reduced for a control target including one turning side motor. However, by reduction of the disturbance, disturbance applied to a control target including another turning side motor that interferes with the one turning side motor becomes large. On the other hand, as described above, by appropriately weakening strength of model following control performed in each model following controller, it is possible to reduce influence of reduction of disturbance in each control target on another control target as disturbance while suitably reducing disturbance for each control target. For this reason, each control target including each turning side motor can share and receive influence of turning side motors interfering with each other in a well-balanced manner. By the above, even in a case where a torque constant of each turning side motor and a detection value of a current sensor (not illustrated) vary, it is possible to easily compensate asynchronization of speeds of the turning side motors.

Further, according to the present example embodiment, the transfer function Pna(s) of the first nominal model NM1 is a transfer function corresponding to a target value of mechanical compliance that is a ratio of the first output angle θg1 of the first turning side motor 33 to the first input torque Tr1. The transfer function Pnb(s) of the second nominal model NM2 is a transfer function corresponding to a target value of mechanical compliance that is a ratio of the second output angle θg2 of the second turning side motor 34 to the second input torque Tr2. That is, model following control for controlling the first control target 65a including the first turning side motor 33 and model following control for controlling the second control target 65b including the second turning side motor 34 are virtual compliance control. Therefore, by restricting each control target to each nominal model, it is possible to control each control target by virtually replacing mechanical compliance from input to output of each turning side motor with preferable mechanical compliance. By the above, a compliance steer characteristic of a vehicle, a steer characteristic of a vehicle, body rigidity of a vehicle, and the like can be suitably compensated. Therefore, steering performance of the steering device 100 can be further improved. Since influence of body rigidity of a vehicle can be compensated, it is not necessary to separately provide a reinforcing member or the like in a vehicle in order to improve motion performance of the vehicle. For this reason, it is possible to improve motion performance of a vehicle while reducing the number of components of the vehicle. Further, since it is not necessary to provide a reinforcing member or the like, weight of a vehicle can be reduced.

Further, according to the present example embodiment, the first control target 65a includes the first turning wheel 21. The second control target 65b includes the second turning wheel 22. For this reason, the virtual compliance control described above can be performed in consideration of inertia, viscosity, rigidity, and the like in the first turning wheel 21 and the second turning wheel 22. Therefore, a compliance steer characteristic of a vehicle, a steer characteristic of a vehicle, body rigidity of a vehicle, and the like can be more suitably compensated, and steering performance in the steering device 100 can be further improved.

According to the present example embodiment, each of the first control target 65a and the second control target 65b includes at least one bushing provided in the turning assembly 20, such as the bushings 23d, 23e, 41a, and 42a. For this reason, the above-described virtual compliance control can be performed in consideration of rigidity and viscosity of each bushing. Therefore, a compliance steer characteristic of a vehicle, a steer characteristic of a vehicle, body rigidity of a vehicle, and the like can be more suitably compensated, and steering performance in the steering device 100 can be further improved.

Further, according to the present example embodiment, the transfer function Pna(s) of the first nominal model NM1 includes at least the function Fan(s) expressed by Formula (13) described above. The function Fan(s) is a function obtained based on a simplified model from the first turning side motor 33 to the first turning wheel 21 illustrated in FIG. 14. Since the transfer function Pna(s) of the first nominal model NM1 includes the function Fan(s), the first control target 65a can be restricted to a more suitable model by model following control. Therefore, steering performance of the steering device 100 can be further improved. Further, by using the function Fan(s), it is possible to put a dynamic characteristic of the turning assembly 20 into the first nominal model NM1 used for model following control. By the above, movement of the turning assembly 20 when the steering wheel 11 is steered can be ideally corrected. Therefore, for example, even in a case where there is unevenness on a road surface on which a vehicle travels, it is possible to prevent the steering wheel 11 from turning in an unintended direction.

Further, according to the present example embodiment, the transfer function Pnb(s) of the second nominal model NM2 includes at least the function Fib(s) expressed by Formula (18) above. The function Fib(s) is a function obtained based on a simplified model from the second turning side motor 34 to the second turning wheel 22, similarly to the simplified model from the first turning side motor 33 to the first turning wheel 21 illustrated in FIG. 14. Since the transfer function Pnb(s) of the second nominal model NM2 includes the function Fib(s), the second control target 65b can be restricted to a more suitable model by model following control. Therefore, steering performance of the steering device 100 can be further improved. Further, by using the function Fib(s), it is possible to put a dynamic characteristic of the turning assembly 20 into the second nominal model NM2 used for model following control. By the above, movement of the turning assembly 20 when the steering wheel 11 is steered can be more ideally corrected. Therefore, for example, even in a case where there is unevenness on a road surface on which a vehicle travels, it is possible to further prevent the steering wheel 11 from turning in an unintended direction.

Further, according to the present example embodiment, the first model following controller 63 calculates a first estimation value including a second interference torque, that is, the first self-aligning torque estimation value SATh1, based on a difference between the torque Tp1 calculated using the first nominal model NM1 based on output of the first control target 65a and the first input torque Tr1. The second model following controller 68 calculates a second estimation value including a first interference torque, that is, the second self-aligning torque estimation value SATh2, based on a difference between the torque Tp2 calculated using the second nominal model NM2 based on output of the second control target 65b and the second input torque Tr2. The steering reaction force controllers 57a and 57b control reaction force transmitted to a steering operator based on a total value obtained by adding the first self-aligning torque estimation value SATh1 and the second self-aligning torque estimation value SATh2, that is, the self-aligning torque estimation value SATh. The first interference torque and the second interference torque have the same absolute value and are inverted in positive and negative. For this reason, when the first self-aligning torque estimation value SATh1 and the second self-aligning torque estimation value SATh2 are added together, the first interference torque and the second interference torque are canceled, and the self-aligning torque estimation value SATh can be calculated as a value not including the first interference torque or the second interference torque. By the above, a total self-aligning torque generated in the first turning wheel 21 and the second turning wheel 22 can be accurately estimated. Therefore, steering reaction force transmitted to a steering operator, that is, the steering torque Th can be set to a suitable value, and the steering feeling of the steering operator can be improved.

In the steer-by-wire steering device, it is necessary to avoid output restriction of a motor due to heat generation of the motor itself, that is, self-heating. A cause of self-heating of a motor is resistance loss (ohmic loss) of current flowing through the motor. A motor generates heat in proportion to the square of current flowing through the motor. In order to prevent excessive self-heating of a motor, an absolute value of maximum current flowing through the motor is preferably reduced to be low. Therefore, in the present example embodiment, in order to suitably prevent self-heating of the first turning side motor 33 and self-heating of the second turning side motor 34, it is effective to equalize current flowing through two turning side motors to reduce an absolute value of maximum current flowing through each of the turning side motors. For this purpose, in order to equalize current flowing through two turning side motors, loads applied to the two turning side motors, that is, motor torques of the two turning side motors are preferably equalized. As described above, since (SATh1+SATh2)/2=SATh1−Tm1=SATh2+Tm1 holds, in order to equalize motor torques of two turning side motors, the correction interference torque Tm1 is preferably subtracted from the first input torque Tr1 of the first turning side motor 33, and the correction interference torque Tm1 is preferably added from the second input torque Tr2 of the second turning side motor 34.

Here, it is assumed that steering reaction force and current flowing through each turning side motor are proportional, and reaction force of each of the first turning wheel 21 and the second turning wheel 22 is assisted by the first turning side motor 33 and the second turning side motor 34. In this case, the sum of a motor torque of the first turning side motor 33 and a motor torque of the second turning side motor 34 in a case of absence of the correction interference torque Tm1 can be expressed by (SATh1+SATh2). The sum of a motor torque of the first turning side motor 33 and a motor torque of the second turning side motor 34 in a case of presence of the correction interference torque Tm1 can be expressed by {(SATh1-Tm1)+(SATh2+Tm1)}. Since a heat value generated in a motor is proportional to the square of a motor torque, it is possible to compare total values of heat amounts generated in two turning side motors in each of a case of absence of the correction interference torque Tm1 and a case of presence of the correction interference torque Tm1 by squaring each motor torque expressed by each of the above formulas. For example, when a formula obtained by squaring a motor torque in the above formula in a case of absence of the correction interference torque Tm1 is subtracted from a formula obtained by squaring a motor torque in the above formula in a case of presence of the correction interference torque Tm1, Formula (20) below is obtained.

Mathematical formula 20

$$2T_{m1}^2 + 2T_{m1}(SAT_{h2} - SAT_{h1}) - 2SAT_{h1}SAT_{h2} = \tag{20}$$
$$2(T_{m1} - SAT_{h1})(T_{m1} + SAT_{h2})$$

In a case where Formula (20) above has a negative value, a heat value is smaller in a case of presence of the correction interference torque Tm1 than in a case of absence of the correction interference torque Tm1. A condition for Formula (20) above having a negative value is −SATh2<Tm1<SATh1 from the right term of Formula (20). As described above, since Tm1=(SATh1−SATh2)/2, it is found that −SATh2<Tm1<SATh1 is satisfied. Therefore, by controlling each turning side motor by using the correction interference torque Tm1, a heat value generated by each of the turning side motors can be reduced as compared with a case where the correction interference torque Tm1 is not used.

On the other hand, in order to stably and responsively control two turning side motors, it is effective to make the two turning side motors non-interfering by the above-described model following control to compensate torque ripple of the turning side motors and the second transmission mechanisms 25a and 25b connected to the turning side motors, influence of friction of each unit, and the like.

With respect to the above matter, according to the present example embodiment, the first model following controller 63 and the second model following controller 68 can execute the cooperative control CT1 as first control to perform control by including the correction interference torques Tm2R and Tm2L in the correction torques Tf1 and Tf2 and the non-interference control CT2 as second control in which influence of the correction interference torques Tm2R and Tm2L on the correction torques Tf1 and Tf2 is smaller than that of the cooperative control CT1. For this reason, the cooperative control CT1 can be employed in a case where emphasis is placed on reducing heat generation in the first turning side motor 33 and heat generation in the second turning side motor 34, and the non-interference control CT2 can be employed in a case where emphasis is placed on stability and responsiveness and make the first turning side motor 33 and the second turning side motor 34 non-interfering. By the above, it is possible to improve steering performance in the steering device 100 by suitably improving stability and responsiveness in each turning side motor while preventing output restriction of the first turning side motor 33 and the second turning side motor 34 due to self-heating.

As described above, in the present example embodiment, in the cooperative control CT1, by actively using torque interference generated between the first turning side motor 33 and the second turning side motor 34, it is possible to reduce self-heating and maximum current required for the first turning side motor 33 and the second turning side motor 34. By the above, it is easy to reduce power consumed in the first turning side motor 33, the second turning side motor 34, the first turning side controller 53, and the second turning side controller 54. Further, even if temperatures that the first turning side motor 33 and the second turning side motor 34 can withstand are lowered, it is easy to prevent limitation on output of the first turning side motor 33 and the second turning side motor 34. For this reason, manufacturing cost of the first turning side motor 33 and the second turning side motor 34 can be reduced.

Torque ripple in each turning side motor or the like is amplified in a case where the steering frequency f is the resonance frequency ωr of the steering device 100 or near the resonance frequency ωr. For this reason, in a case where the steering frequency f is the resonance frequency ωr of the steering device 100 or near the resonance frequency ωr, the steering device 100 is likely to be unstable, and traveling of the vehicle is likely to be unstable. Therefore, in a case where the steering frequency f is the resonance frequency ωr or near the resonance frequency ωr, it is preferable to perform the non-interference control CT2 to suitably compensate torque ripple, stabilize the steering device 100, and stabilize traveling of a vehicle. On the other hand, in a case where the steering frequency f is a frequency sufficiently away from the resonance frequency ωr, that is, for example, when the steering frequency f is sufficiently lower than the resonance frequency ωr, traveling of a vehicle and the steering device 100 are less likely to become unstable. For this reason, in a case where the steering frequency f is a frequency sufficiently away from the resonance frequency ωr, it is preferable to reduce self-heating in each turning side motor by performing the cooperative control CT1.

With respect to the above matter, according to the present example embodiment, the cooperative control CT1 and the non-interference control CT2 are switched based on the steering frequency f, which is a frequency of the steering angle θh that changes when the steering wheel 11 is steered. The steering frequency f when the non-interference control CT2 is executed is higher than the steering frequency f when the cooperative control CT1 is executed. For this reason, in a case where the steering frequency f is relatively high and is likely to be a frequency close to the resonance frequency ωr, the first model following controller 63 and the second model following controller 68 can execute the non-interference control CT2, and in a case where the steering frequency f is relatively low and is likely to be a frequency away from the resonance frequency ωr, the first model following controller 63 and the second model following controller 68 can execute the cooperative control CT1. Therefore, it is possible to suitably switch between the cooperative control CT1 and the non-interference control CT2, and it is possible to prevent self-heating of the first turning side motor 33 and self-heating of the second turning side motor 34 from becoming excessively large while stabilizing traveling of a vehicle.

Further, according to the present example embodiment, the cooperative controllers 56a and 56b generate, as the correction interference torques Tm2R and Tm2L, a value obtained by applying low-pass filter processing to a value of half a difference between the first self-aligning torque estimation value SATh1 including a self-aligning torque generated in the first turning wheel 21 and output from the first model following controller 63 and the second self-aligning torque estimation value SATh2 including a self-aligning torque generated in the second turning wheel 22 and output from the second model following controller 68. For this reason, a value of the correction interference torques Tm2R and Tm2L can be adjusted according to the steering frequency f. Specifically, a value of the correction interference torques Tm2R and Tm2L is not attenuated in a case where the steering frequency f is equal to or less than a cutoff frequency of a low-pass filter that performs low-pass filter processing, and a value of the correction interference torques Tm2R and Tm2L can be attenuated in a case where the steering frequency f is higher than a cutoff frequency of a low-pass filter that performs low-pass filter processing. By the above, even in control in which the correction interference torques Tm2R and Tm2L are always included in the correction torques Tf1 and Tf2, influence of the correction interference torques Tm2R and Tm2L in the correction torques Tf1 and Tf2 can be changed by the steering frequency f. Therefore, it is not necessary to perform control for switching whether or not to include the correction interference torques Tm2R and Tm2L in the correction torques Tf1 and Tf2, and the cooperative control CT1 and the non-interference control CT2 can be automatically switched.

Further, according to the present example embodiment, a cutoff frequency in low-pass filter processing performed by the cooperative controllers 56a and 56b, that is, the cutoff frequency ω1 in the frequency domain setter 56d is lower than the mechanical resonance frequency or in the steering device 100. For this reason, in a case where the steering frequency f becomes the resonance frequency ωr or near the resonance frequency ωr, a gain in the frequency domain setter 56d can be reduced, and the correction interference torques Tm2R and Tm2L can be easily reduced. By the above, in a case where the steering frequency f becomes the resonance frequency ωr or near the resonance frequency ωr, control executed in the first model following controller 63 and the second model following controller 68 is easily set to the non-interference control CT2. Further, in a case where the steering frequency f is sufficiently lower than the resonance frequency ωr, a gain in the frequency domain setter 56d is easily set to one, and the correction interference torques Tm2R and Tm2L are easily included in the correction torques Tf1 and Tf2 without being attenuated. By the above, in a case where the steering frequency f is sufficiently lower than the resonance frequency ωr, it is easy to set control executed in the first model following controller 63 and the second model following controller 68 to the cooperative control CT1. In the present example embodiment, the first model following controller 63 and the second model following controller 68 perform the non-interference control CT2 that is substantially complete in a case where the steering frequency f is 10 Hz or more and 50 Hz or less, and perform the cooperative control CT1 in a case where the steering frequency f is 5 Hz or less. In the present example embodiment, the first model following controller 63 and the second model following controller 68 mainly perform the cooperative control CT1 and partially perform the non-interference control CT2, so as to perform control to compensate influence of friction and torque ripple. Note that, also in the cooperative control CT1, torque ripple, friction, and the like of each turning side motor are compensated by model following control.

Each functional block in the first steering side controller 51, the second steering side controller 52, the first turning side controller 53, and the second turning side controller 54 described above may be implemented in each processor provided in each controller as software such as firmware, may be implemented in each processor as hardware, or may be implemented in each processor as software and hardware. Processing of each functional block in a processor provided in each controller is typically described in a computer program in units of software modules and stored in a ROM (not illustrated). However, in a case where an FPGA or the like is used, all or a portion of the functional blocks may be implemented as hardware accelerators. Further, a control method of the control device 50 according to the present example embodiment described above is implemented in a computer, and may be implemented by causing the computer to execute desired operation.

Figure 17:
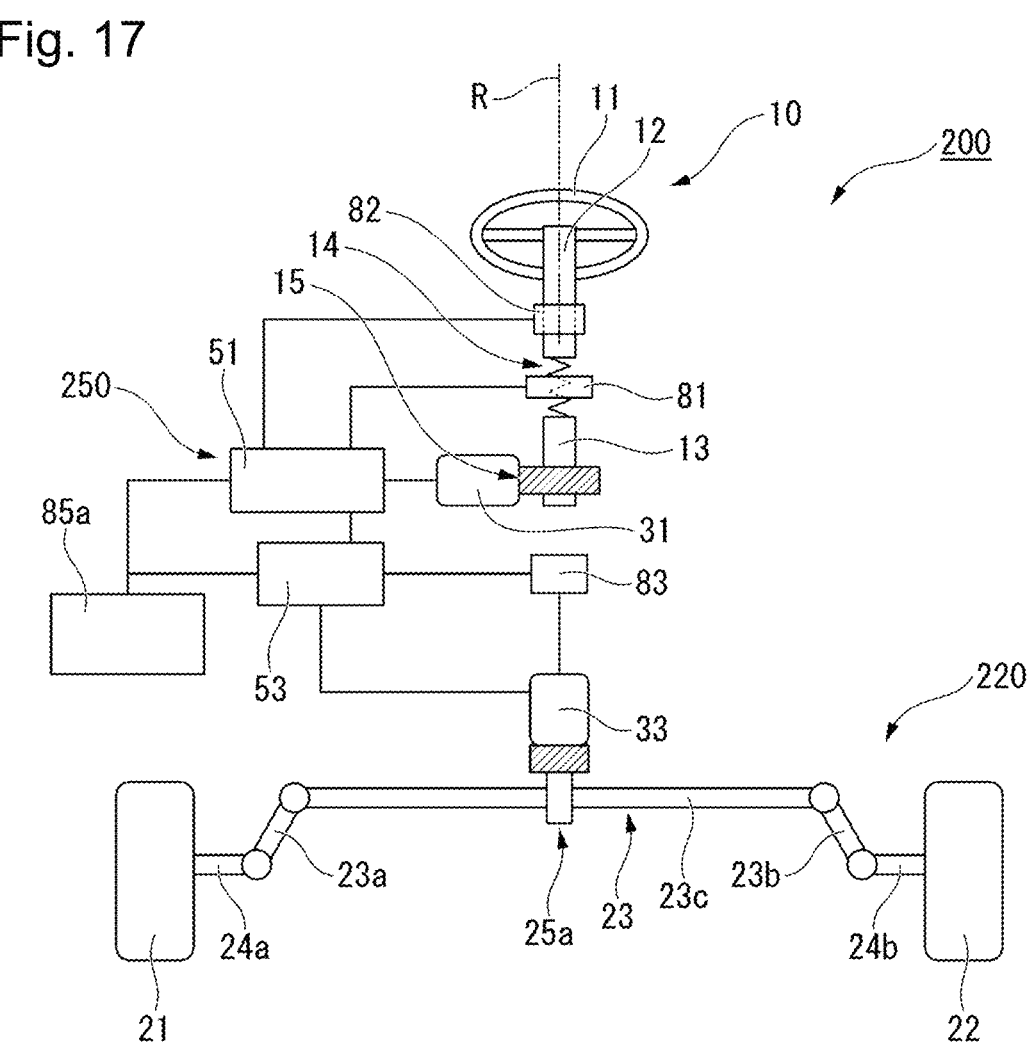
FIG. 17 is a diagram schematically illustrating the steering device according to a second example embodiment of the present disclosure.

In description below, a configuration and the like similar to those of the above example embodiment may be denoted by the identical reference numerals as appropriate, and may be omitted from description. As illustrated in FIG. 17, unlike the steering device 100 in the first example embodiment, a steering device 200 of the present example embodiment does not include the second steering side motor 32, the second turning side motor 34, the second rotation sensor 84, or the second battery 85*b*. That is, the steering device 200 includes only one steering side motor, one turning side motor, one rotation sensor, and one battery.

A turning assembly 220 of the present example embodiment does not include the second transmission mechanism 25*b* unlike the turning assembly 20 of the first example embodiment. In the turning assembly 220 of the present example embodiment, the second transmission mechanism 25*a* is connected to a central portion in the vehicle width direction of the rack shaft 23*c*. Other configurations of the turning assembly 220 are similar to other configurations of the turning assembly 20 in the first example embodiment.

Unlike the control device 50 in the first example embodiment, a control device 250 of the present example embodiment does not include the second steering side controller 52 or the second turning side controller 54. That is, the control device 250 includes only one steering side controller and one turning side controller. The first steering side controller 51 of the control device 250 of the present example embodiment executes control similar to control performed by the first steering side controller 51 and the second steering side controller 52 in the first example embodiment. The first turning side controller 53 of the control device 250 of the present example embodiment executes control similar to control performed by the first turning side controller 53 and the second turning side controller 54 in the first example embodiment. In the control device 250 of the present example embodiment, the first model following controller 63 of the first turning side controller 53 is configured such that, in a frequency band in which a gain in a gain characteristic of a complementary sensitivity function with respect to a modeling error between a control target including the first turning side motor 33 and a nominal model based on a configuration of the control target is approximately one, a transfer function of the control target is restricted to a transfer function of the nominal model. For this reason, as described in the first example embodiment above, a control target can be treated as a desired model by appropriately setting a nominal model. By the above, it is possible to suitably adjust responsiveness and the like of each turning wheel with respect to steering of the steering wheel 11. Therefore, steering performance of the steering device 200 can be improved.

Other configurations of the control device 250 are similar to other configurations of the control device 50 in the first example embodiment. Other configurations of the steering device 200 are similar to other configurations of the steering device 100 in the first example embodiment.

The present disclosure is not limited to the above example embodiment, and other configurations and other methods can be employed within the scope of the technical idea of the present disclosure. A first nominal model may be a model having any transfer function as long as the first nominal model is a model based on a configuration of a first control target. A second nominal model may be a model having any transfer function as long as the second nominal model is a model based on a configuration of a second control target. A transfer function of the first nominal model may be a transfer function obtained by multiplying the function Fan(s) above by another function. A transfer function of the second nominal model may be a transfer function obtained by multiplying the function Fib(s) above by another function. The first control target is not particularly limited as long as the first control target includes a first turning side motor. The second control target is not particularly limited as long as the second control target includes the second turning side motor. Each of the first control target and the second control target may include at least a portion of a vehicle body. In this case, body rigidity and the like of a vehicle can be more suitably compensated. The configuration may also be such that only one turning side motor and one turning side controller are provided.

Note that the present techniques can have any of the configurations described below.

(1) A control device mounted on a steer-by-wire steering device mounted on a vehicle, the control device including a steering assembly including a steering wheel to be steered by a steering operator; a turning assembly including a first turning wheel and a second turning wheel; a turning side motor to drive the turning assembly; and a turning side controller configured or programmed to control a control target including the turning side motor, in which the turning side controller is configured or programmed to include a model following controller configured or programmed to generate a correction torque to correct an input torque input to the control target based on output of the control target and a nominal model based on a configuration of the control target, and the model following controller is configured or programmed such that, in a frequency band in which a gain in a gain characteristic of a complementary sensitivity function with respect to a modeling error between the control target and the nominal model is approximately one, a transfer function of the control target is restricted to a transfer function of the nominal model.

(2) In the control device according to (1), a transfer function of the nominal model is a transfer function corresponding to a target value of mechanical compliance that is a ratio of an output angle of the turning side motor to the input torque.

(3) In the control device according to (1), the turning side motor includes a first turning side motor; and a second turning side motor, the turning side controller is configured or programmed to includes a first turning side controller configured or programmed to control a first control target including the first turning side motor; and a second turning side controller configured or programmed to control a second control target including the second turning side motor, a first interference torque caused by the first turning side motor driving the turning assembly is applied to the second control target, a second interference torque caused by the second turning side motor driving the turning assembly is applied to the first control target, the first turning side controller is configured or programmed to include a first model following controller configured or programmed to generate a correction torque to correct a first input torque input to the first control target based on output of the first control target and a first nominal model based on a configuration of the first control target, the second turning side controller is configured or programmed to include a second model following controller configured or programmed to generate a correction torque to correct a second input torque input to the second control target based on output of the second control target and a second nominal model based on a configuration of the second control target, the first model following controller is configured or programmed such that, in a frequency band in which a gain in a gain characteristic of a complementary sensitivity function with respect to a modeling error between the first control target and the first nominal model is approximately one, a transfer function of the first control target is restricted to a transfer function of the first nominal model, and the second model following controller is configured or programmed such that, in a frequency band in which a gain in a gain characteristic of a complementary sensitivity function with respect to a modeling error between the second control target and the second nominal model is approximately one, a transfer function of the second control target is restricted to a transfer function of the second nominal model.

(4) In the control device according to claim (1), the control device being mounted on a steer-by-wire steering device mounted on a vehicle, the control device including a steering assembly including a steering wheel to be steered by a steering operator; a turning assembly including a first turning wheel and a second turning wheel; a first turning side motor and a second turning side motor that drive the turning assembly, a first turning side controller configured or programmed to control a first control target including the first turning side motor, and a second turning side controller configured or programmed to control a second control target including the second turning side motor, a first interference torque caused by the first turning side motor driving the turning assembly is applied to the second control target, a second interference torque caused by the second turning side motor driving the turning assembly is applied to the first control target, the first turning side controller is configured or programmed to compensate the second interference torque by model following control of restricting a transfer function of the first control target to a transfer function of a first nominal model based on a configuration of the first control target, and the second turning side controller is configured or programmed to compensate the first interference torque by model following control of restricting a transfer function of the second control target to a transfer function of a second nominal model based on a configuration of the second control target.

(5) In the control device according to (3) or (4), a transfer function of the first nominal model is a transfer function corresponding to a target value of mechanical compliance that is a ratio of an output angle of the first turning side motor to the first input torque, and a transfer function of the second nominal model is a transfer function corresponding to a target value of mechanical compliance that is a ratio of an output angle of the second turning side motor to the second input torque.

(6) In the control device according to (5), the first control target includes the first turning wheel, and the second control target includes the second turning wheel.

(7) In the control device according to (6), each of the first control target and the second control target includes at least one bushing provided in the turning assembly.

(8) In the control device according to (7), a transfer function of the first nominal model includes at least a function Fan(s) expressed by a following formula:

$$F_{na}(s) = \frac{1}{J_{n1}s^2 + B_{n1}s} \frac{s^2 + \alpha_{b1}s + \alpha_{k1}}{s^2 + \beta_{b1}s + \beta_{k1}}$$

$$J_{n1} = J_{m1}, B_{n1} = \frac{B_{m1}}{G_1}, \alpha_{b1} = \frac{B_{Tyre1}}{G_1^2 J_{Tyre1}}$$

$$\alpha_{k1} = \frac{K_{Bush1}}{G_1^2 J_{Tyre1}}, \beta_{b1} = \frac{B_{Tyre1}}{J_{Tyre1}}, \beta_{k1} = \frac{K_{Bush1}}{J_{Tyre1}}$$

where s is a Laplace variable, Jm1 is a parameter corresponding to moment of inertia of the first turning side motor, Bm1 is a parameter corresponding to a viscous friction coefficient of the first turning side motor, JTyre1 is a parameter corresponding to moment of inertia of the first turning wheel, BTyre1 is a parameter corresponding to a viscous friction coefficient of the first turning wheel, KBush1 is a parameter corresponding to an equivalent spring constant of an elastic element including the bushing in the first control target, and G1 is a parameter corresponding to a gear ratio from the first turning side motor to the first turning wheel.

(9) In the control device according to (7) or (8), a transfer function of the second nominal model includes at least a function Fib(s) expressed by a following formula:

$$F_{nb}(s) = \frac{1}{J_{n2}s^2 + B_{n2}s} \frac{s^2 + \alpha_{b2}s + \alpha_{k2}}{s^2 + \beta_{b2}s + \beta_{k2}}$$

$$J_{n2} = J_{m2}, B_{n2} = \frac{B_{m2}}{G_2}, \alpha_{b2} = \frac{B_{Tyre2}}{G_2^2 J_{Tyre2}}$$

$$\alpha_{k2} = \frac{K_{Bush2}}{G_2^2 J_{Tyre2}}, \beta_{b2} = \frac{B_{Tyre2}}{J_{Tyre2}}, \beta_{k2} = \frac{K_{Bush2}}{J_{Tyre2}}$$

where s is a Laplace variable, Jm2 is a parameter corresponding to the moment of inertia of the second turning side motor, Bm2 is a parameter corresponding to a viscous friction coefficient of the second turning side motor, JTyre2 is a parameter corresponding to moment of inertia of the second turning wheel, BTyre2 is a parameter corresponding to a viscous friction coefficient of the second turning wheel, KBush2 is a parameter corresponding to an equivalent spring constant of an elastic element including the bushing in the second control target, and G2 is a parameter corresponding to a gear ratio from the second turning side motor to the second turning wheel.

(10) The control device according to any one of (6) to (9) further includes: a steering reaction force controller configured or programmed to control steering reaction force transmitted to the steering operator via the steering wheel; in which the first model following controller is configured or programmed to calculate a first estimation value including the second interference torque based on a difference between a torque calculated using the first nominal model based on output of the first control target and the first input torque, the second model following controller is configured or programmed to calculate a second estimation value including the first interference torque based on a difference between a torque calculated using the second nominal model based on output of the second control target and the second input torque, and the steering reaction force controller is configured or programmed to control reaction force transmitted to the steering operator based on a total value obtained by adding the first estimation value and the second estimation value.

(11) In the control device according to any one of (6) to (10), each of the first control target and the second control target includes at least a portion of a vehicle body.

(12) The control device according to any one of (3) to (11) further includes a cooperative controller configured or programmed to that generate a correction interference torque based on a value output from the first model following controller and a value output from the second model following controller, in which the first model following controller and the second model following controller are capable of executing first control to perform control by including the correction interference torque in the correction torque, and second control in which influence of the correction interference torque on the correction torque is smaller than that in the first control.

(13) In the control device according to (12), the first control and the second control are switched based on a steering frequency which is a frequency of a steering angle changed by steering of the steering wheel, and the steering frequency when the second control is executed is higher than the steering frequency when the first control is executed.

(14) In the control device according to (13), the cooperative controller is configured or programmed to generate, as the correction interference torque, a value obtained by performing low-pass filter processing on a value of half a difference between an estimation value including a self-aligning torque generated in the first turning wheel and output from the first model following controller and an estimation value including a self-aligning torque generated in the second turning wheel and output from the second model following controller.

(15) In the control device according to (14), a cutoff frequency in the low-pass filter processing is lower than a mechanical resonance frequency in the steering device.

(16) A steer-by-wire steering device including a steering assembly including a steering wheel to be steered by a steering operator; a turning assembly including a first turning wheel and a second turning wheel; a first turning side motor and a second turning side motor that drive the turning assembly; and the control device according to any one of (3) to (15).

(17) In the steer-by-wire steering device according to (16), a stator in the first turning side motor includes coil groups of a plurality of systems, and in the first turning side motor, the coil groups of different systems are arranged rotationally symmetrically around a central axis of the first turning side motor.

(18) In the steer-by-wire steering device according to (17), the first turning side controller includes a plurality of inverter circuits to independently supply power to the coil groups of a plurality of systems in the first turning side motor.

(19) In the steer-by-wire steering device according to (18), a stator in the second turning side motor includes coil groups of a plurality of systems, in the second turning side motor, the coil groups of different systems are arranged rotationally symmetrically around a central axis of the second turning side motor, and the second turning side controller includes a plurality of inverter circuits to independently supply power to the coil groups of a plurality of systems in the second turning side motor.

(20) The steer-by-wire steering device according to any one of (16) to (19) further includes a first steering side motor and a second steering side motor capable of driving the steering assembly, in which the control device includes: a first steering side controller configured or programmed to control the first steering side motor; and a second steering side controller configured or programmed to control the second steering side motor, the first steering side controller and the first turning side controller are configured or programmed to communicate with each other, and the second steering side controller and the second turning side controller are configured or programmed to communicate with each other.

The configurations and methods described above in the present description can be appropriately combined within a range consistent with each other.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device mounted on a steer-by-wire steering device mounted on a vehicle, the control device comprising:
a steering assembly including a steering wheel to be steered by a steering operator;
a turning assembly including a first turning wheel and a second turning wheel;
a turning side motor to drive the turning assembly; and
a turning side controller configured or programmed to control a control target including the turning side motor; wherein
the turning side controller is configured or programmed to include a model following controller configured or programmed to generate a correction torque to correct an input torque input to the control target based on output of the control target and a nominal model based on a configuration of the control target;
the model following controller is configured or programmed such that, in a frequency band in which a gain in a gain characteristic of a complementary sensitivity function with respect to a modeling error between the control target and the nominal model is a number approaching one, a transfer function of the control target is restricted to a transfer function of the nominal model;

the turning side motor includes:
a first turning side motor; and
a second turning side motor;

the turning side controller is configured or programmed to include:
a first turning side controller configured or programmed to control a first control target including the first turning side motor; and
a second turning side controller configured or programmed to control a second control target including the second turning side motor;

a first interference torque caused by the first turning side motor driving the turning assembly is applied to the second control target;

a second interference torque caused by the second turning side motor driving the turning assembly is applied to the first control target;

the first turning side controller is configured or programmed to include a first model following controller configured or programmed to generate a correction torque to correct a first input torque input to the first control target based on output of the first control target and a first nominal model based on a configuration of the first control target;

the second turning side controller is configured or programmed to include a second model following controller configured or programmed to generate a correction torque to correct a second input torque input to the second control target based on output of the second control target and a second nominal model based on a configuration of the second control target;

the first model following controller is configured or programmed such that, in a frequency band in which a gain in a gain characteristic of a complementary sensitivity function with respect to a modeling error between the first control target and the first nominal model is a number approaching one, a transfer function of the first control target is restricted to a transfer function of the first nominal model; and the second model following controller is configured or programmed such that, in a frequency band in which a gain in a gain characteristic of a complementary sensitivity function with respect to a modeling error between the second control target and the second nominal model is a number approaching one, a transfer function of the second control target is restricted to a transfer function of the second nominal model.

2. The control device according to claim 1, wherein a transfer function of the nominal model is a transfer function corresponding to a target value of mechanical compliance that is a ratio of an output angle of the turning side motor to the input torque.

3. The control device according to claim 1, wherein
the turning side motor includes:
a first turning side motor; and
a second turning side motor;

the turning side controller is configured or programmed to include:
a first turning side controller configured or programmed to control a first control target including the first turning side motor; and
a second turning side controller configured or programmed to control a second control target including the second turning side motor;

a first interference torque caused by the first turning side motor driving the turning assembly is applied to the second control target;

a second interference torque caused by the second turning side motor driving the turning assembly is applied to the first control target;

the first turning side controller is configured or programmed to compensate the second interference torque by model following control of restricting a transfer function of the first control target to a transfer function of a first nominal model based on a configuration of the first control target; and the second turning side controller is configured or programmed to compensate the first interference torque by model following control of restricting a transfer function of the second control target to a transfer function of a second nominal model based on a configuration of the second control target.

4. The control device according to claim 1, wherein a transfer function of the first nominal model is a transfer function corresponding to a target value of mechanical compliance that is a ratio of an output angle of the first turning side motor to the first input torque; and a transfer function of the second nominal model is a transfer function corresponding to a target value of mechanical compliance that is a ratio of an output angle of the second turning side motor to the second input torque.

5. The control device according to claim 4, wherein the first control target includes the first turning wheel; and the second control target includes the second turning wheel.

6. The control device according to claim 5, wherein each of the first control target and the second control target includes at least one bushing provided in the turning assembly.

7. The control device according to claim 6, wherein a transfer function of the first nominal model includes at least a function Fan(s) expressed by a following formula:

$$F_{na}(s) = \frac{1}{J_{n1}s^2 + B_{n1}s} \frac{s^2 + \alpha_{b1}s + \alpha_{k1}}{s^2 + \beta_{b1}s + \beta_{k1}}$$

$$J_{n1} = J_{m1}, \ B_{n1} = \frac{B_{m1}}{G_1}, \ \alpha_{b1} = \frac{B_{Tyre1}}{G_1^2 J_{Tyre1}}$$

$$\alpha_{k1} = \frac{K_{Bush1}}{G_1^2 J_{Tyre1}}, \ \beta_{b1} = \frac{B_{Tyre1}}{J_{Tyre1}}, \ \beta_{k1} = \frac{K_{Bush1}}{J_{Tyre1}}$$

where s is a Laplace variable, Jm1 is a parameter corresponding to moment of inertia of the first turning side motor, Bm1 is a parameter corresponding to a viscous friction coefficient of the first turning side motor, JTyre1 is a parameter corresponding to moment of inertia of the first turning wheel, BTyre1 is a parameter corresponding to a viscous friction coefficient of the first turning wheel, KBush1 is a parameter corresponding to an equivalent spring constant of an elastic element including the bushing in the first control target, and G1 is a parameter corresponding to a gear ratio from the first turning side motor to the first turning wheel.

8. The control device according to claim 6, wherein
a transfer function of the second nominal model includes
at least a function Fib(s) expressed by a following
formula:

$$F_{nb}(s) = \frac{1}{J_{n2}s^2 + B_{n2}s} \frac{s^2 + \alpha_{b2}s + \alpha_{k2}}{s^2 + \beta_{b2}s + \beta_{k2}}$$

$$J_{n2} = J_{m2}, B_{n2} = \frac{B_{m2}}{G_2}, \alpha_{b2} = \frac{B_{Tyre2}}{G_2^2 J_{Tyre2}}$$

$$\alpha_{k2} = \frac{K_{Bush2}}{G_2^2 J_{Tyre2}}, \beta_{b2} = \frac{B_{Tyre2}}{J_{Tyre2}}, \beta_{k2} = \frac{K_{Bush2}}{J_{Tyre2}}$$

where s is a Laplace variable, Jm2 is a parameter corre-
sponding to moment of inertia of the second turning
side motor, Bm2 is a parameter corresponding to a
viscous friction coefficient of the second turning side
motor, JTyre2 is a parameter corresponding to moment
of inertia of the second turning wheel, BTyre2 is a
parameter corresponding to a viscous friction coeffi-
cient of the second turning wheel, KBush2 is a param-
eter corresponding to an equivalent spring constant of
an elastic element including the bushing in the second
control target, and G2 is a parameter corresponding to
a gear ratio from the second turning side motor to the
second turning wheel.

9. The control device according to claim 5, further com-
prising:
a steering reaction force controller configured or pro-
grammed to control a steering reaction force transmit-
ted to the steering operator via the steering wheel;
wherein
the first model following controller is configured or
programmed to calculate a first estimation value includ-
ing the second interference torque based on a difference
between a torque calculated using the first nominal
model based on output of the first control target and the
first input torque;
the second model following controller is configured or
programmed to calculate a second estimation value
including the first interference torque based on a dif-
ference between a torque calculated using the second
nominal model based on output of the second control
target and the second input torque; and
the steering reaction force controller is configured or
programmed to control a reaction force transmitted to
the steering operator based on a total value obtained by
adding the first estimation value and the second esti-
mation value.

10. The control device according to claim 5, wherein each
of the first control target and the second control target
includes at least a portion of a vehicle body.

11. The control device according to claim 1, further
comprising:
a cooperative controller configured or programmed to
generate a correction interference torque based on a
value output from the first model following controller
and a value output from the second model following
controller; wherein
the first model following controller and the second model
following controller are capable of executing first con-
trol to perform control by including the correction
interference torque in the correction torque, and second control in which influence of the correction interference
torque on the correction torque is smaller than that in
the first control.

12. The control device according to claim 11, wherein
the first control and the second control are switched based
on a steering frequency which is a frequency of a
steering angle changed by steering of the steering
wheel; and
the steering frequency when the second control is
executed is higher than the steering frequency when the
first control is executed.

13. The control device according to claim 12, wherein the
cooperative controller is configured or programmed to gen-
erate, as the correction interference torque, a value obtained
by performing low-pass filter processing on a value of half
a difference between an estimation value including a self-
aligning torque generated in the first turning wheel and
output from the first model following controller and an
estimation value including a self-aligning torque generated
in the second turning wheel and output from the second
model following controller.

14. The control device according to claim 13, wherein a
cutoff frequency in the low-pass filter processing is lower
than a mechanical resonance frequency in the steering
device.

15. A steer-by-wire steering device comprising:
a steering assembly including a steering wheel to be
steered by a steering operator;
a turning assembly including a first turning wheel and a
second turning wheel;
a first turning side motor and a second turning side motor
that drive the turning assembly; and
the control device according to claim 1.

16. The steer-by-wire steering device according to claim
15, wherein
a stator in the first turning side motor includes coil groups
of a plurality of systems; and
in the first turning side motor, the coil groups of different
systems of the plurality of systems are arranged rota-
tionally symmetrically around a central axis of the first
turning side motor.

17. The steer-by-wire steering device according to claim
16, wherein the first turning side controller includes a
plurality of inverter circuits to independently supply power
to the coil groups of the plurality of systems in the first
turning side motor.

18. The steer-by-wire steering device according to claim
17, wherein
a stator in the second turning side motor includes coil
groups of a plurality of systems;
in the second turning side motor, the coil groups of
different systems of the plurality of systems are
arranged rotationally symmetrically around a central
axis of the second turning side motor; and
the second turning side controller includes a plurality of
inverter circuits to independently supply power to the
coil groups of the plurality of systems in the second
turning side motor.

19. The steer-by-wire steering device according to claim
15, further comprising:
a first steering side motor and a second steering side motor
capable of driving the steering assembly; wherein
the control device includes:
a first steering side controller configured or programmed
to control the first steering side motor; and
a second steering side controller configured or pro-
grammed to control the second steering side motor;

the first steering side controller and the first turning side controller are configured or programmed to communicate with each other; and the second steering side controller and the second turning side controller are configured or programmed to communicate with each other.

* * * * *